US011176782B2

(12) United States Patent
Mahmoodi

(10) Patent No.: US 11,176,782 B2
(45) Date of Patent: Nov. 16, 2021

(54) SELECTIVELY MODIFYING, PROCESSING, AND BLOCKING DATA REPRESENTING MACHINE-READABLE CODES

(71) Applicant: OneFabric Technologies, San Ramon, CA (US)

(72) Inventor: Reza Mahmoodi, San Ramon, CA (US)

(73) Assignee: OneFabric Technologies, San Ramon, CA (US)

( * ) Notice: Subject to any disclaimer, the term of this patent is extended or adjusted under 35 U.S.C. 154(b) by 0 days.

(21) Appl. No.: 17/017,024

(22) Filed: Sep. 10, 2020

(65) Prior Publication Data

US 2021/0104115 A1 Apr. 8, 2021

Related U.S. Application Data

(60) Provisional application No. 62/912,519, filed on Oct. 8, 2019.

(51) Int. Cl.
*G06K 7/14* (2006.01)
*G07F 17/32* (2006.01)

(52) U.S. Cl.
CPC ......... *G07F 17/329* (2013.01); *G06K 7/1434* (2013.01); *G07F 17/3225* (2013.01)

(58) Field of Classification Search
CPC ... G07F 17/329; G07F 17/3225; G06Q 20/20; G06Q 20/202; G07G 1/0045; G06K 7/1434
See application file for complete search history.

(56) References Cited

U.S. PATENT DOCUMENTS

| 5,216,595 | A | * | 6/1993 | Protheroe | G07C 15/005 463/17 |
| 7,621,810 | B2 | * | 11/2009 | Gilmore | G06Q 20/202 221/1 |
| 2009/0221343 | A1 | * | 9/2009 | Ekisheva | G07F 17/329 463/17 |
| 2009/0292600 | A1 | | 11/2009 | Davis | |
| 2013/0200606 | A1 | | 8/2013 | Omar | |
| 2015/0081414 | A1 | | 3/2015 | Veverka et al. | |
| 2017/0018148 | A1 | | 1/2017 | Behm et al. | |
| 2019/0073652 | A1 | | 3/2019 | Garrison | |

* cited by examiner

*Primary Examiner* — David L Lewis
*Assistant Examiner* — Robert E Mosser
(74) *Attorney, Agent, or Firm* — Raubvogel Law Office

(57) ABSTRACT

A device communicates with a scanner, such as a barcode scanner in a retail environment, and with a point-of-sale (POS) register. The device can process different types of machine-readable codes, such as scanned UPCs and unique barcodes associated with individual scratcher cards and/or other items. Data captured by the scanner passes through the device before reaching the POS register; such data may be selectively retransmitted (with or without modification) to the POS register and/or to a server or other device, or it may be blocked from reaching the POS register, server, and/or other device, depending on the current mode of operation. For example, the device can selectively relay some information (such as UPC data) to the POS register to process sales transactions, and/or can relay other information (such as unique barcode data) to server(s) to perform inventory tracking functions, while blocking such unique barcode data from reaching the POS register.

39 Claims, 14 Drawing Sheets

Name: _____ 601    Date _____ 602    607  608  609
Shift 1 or 2

Bellerose Shell SHIFT REPORT

| | GAME # | GAME $ | GAME NAME | START | END | TOTAL SOLD | TOTAL $ |
|---|---|---|---|---|---|---|---|
| 1 | 1365 | 30 | Bank Roll | | | | |
| 2 | 1347 | 20 | Instant Prize Crossword | | | | |
| 3 | 1360 | 20 | Mega Cash | | | | |
| 4 | 1369 | 20 | Ultimate 7's | | | | |
| 5 | 1368 | 10 | Mega 7 | | | | |
| 6 | 1364 | 10 | Mystery Crossword | | | | |
| 7 | 1350 | 10 | Monopoly $10 | | | | |
| 8 | 1373 | 10 | Bonus Multiplier | | | | |
| 9 | 1372 | 5 | Casino Cash | | | | |
| 10 | 1349 | 5 | Monopoly $5 | | | | |
| 11 | 1367 | 5 | Super 7 | | | | |
| 12 | 1341 | 5 | Crossword Connect | | | | |
| 13 | 1358 | 5 | $75,000 Poker | | | | |
| 14 | 1354 | 5 | Mega Crossword | | | | |
| 15 | 1359 | 5 | Lady Luck | | | | |
| 16 | 1371 | 3 | California Cross Word | | | | |
| 17 | 1331 | 3 | 5X Crossword Bons | | | | |
| 18 | 1344 | 3 | Loteria | | | | |
| 19 | 1357 | 3 | Line Em Up | | | | |
| 20 | 1353 | 3 | Ancinet Riches | | | | |
| 21 | 1366 | 2 | Winning 7 | | | | |
| 22 | 1348 | 2 | Monopoly | | | | |
| 23 | 1370 | 2 | Easy 123 | | | | |
| 24 | 1356 | 1 | Beginner's Luck | | | | |
| 25 | | | | | TOTAL | | |

SELECTIVELY MODIFYING, PROCESSING, AND BLOCKING DATA REPRESENTING MACHINE-READABLE CODES

CROSS-REFERENCE TO RELATED APPLICATION

The present application claims the benefit of U.S. Provisional Application Ser. No. 62/912,519 for "Capturing, Analyzing, and Modifying Sensor Data Representing Ticket Inventory", filed Oct. 8, 2019, which is incorporated by reference herein in its entirety.

TECHNICAL FIELD

The present document relates to systems and methods for processing data representing machine-readable codes, such as barcode data related to retail transactions.

BACKGROUND

Retailers have an interest in tracking inventory of items such as lottery scratch-off tickets, also known as "scratchers" or "scratcher cards." A scratcher card is a type of lottery ticket in the form of a card that contains information (such as numbers and/or symbols) concealed behind a thin layer of opaque material. After purchasing the card, the shopper scratches off the thin layer to reveal the information. If the information satisfies some predetermined criteria for winning, the shopper can submit the card to a lottery merchant (or other location) to redeem his or her prize.

Referring now to FIG. 1, there is shown an example of a scratcher card 100. In general, each scratcher card has two different machine-readable barcodes 101, 102. Barcode 101 represents a unique ticket number for that scratcher card 100, and can be used for taking inventory and/or to check whether a particular scratcher card 100 is a winner. In general, unique barcodes 101 represent sequential numbers within a stack of cards.

Barcode 102 is a UPC (Universal Product Code) that represents the type of game (e.g., Mystery Crossword). In general, UPCs 102 are not unique; rather they are the same for all scratcher cards of a given game or type. Point-of-sale (POS) registers use UPC 102 when processing a sale of a ticket. In general, such POS registers are not designed to recognize or make use of unique barcode 101 or the ticket number it represents.

In the particular layout of scratcher card 100 shown in the example of FIG. 1, unique barcode 101 is positioned at the bottom, while non-unique UPC 102 is positioned at the at the top. In general, for all scratcher cards 100 of a particular type, UPC 102 would be the same, while barcode 101 would be different.

In general, scratcher cards such as card 100 come in stacks, including one (or more) stack(s) for each type of game. A conventional approach to taking inventory, performed for example at the end of an employee's work shift, involves manually recording the unique ticket number corresponding to barcode 101 of the topmost card 100 in each stack, and subtracting this ticket number from the unique ticket number corresponding to a previously recorded barcode 101 (for example at the end of a previous shift). The difference between the ticket number values theoretically should equal the number of cards sold during the shift. This expected quantity can then be validated by checking against sales records from the POS register. In theory, any discrepancy between the two recorded quantities indicates a potential loss or theft of scratcher cards.

Due to their easy conversion to cash prizes, scratcher cards are valuable pieces of tender, and theft of scratcher cards is rampant. To detect and prevent theft, sellers (retailers) must take careful inventory of their scratcher cards to identify any cards that are missing and unaccounted for in sales records. However, conventional processes for manually taking inventory of scratcher cards at the end of each work shift can be cumbersome, time-consuming, inaccurate, and unreliable. In addition, existing techniques entail substantial lag time before a theft is detected.

SUMMARY

The present document relates to techniques for implementing an improved system and method for capturing, processing, modifying, and/or selectively blocking data representing machine-readable codes, such as barcode data representing lottery tickets and/or other items. In at least one embodiment, the described techniques make use of sequential barcodes (or other types of codes) on lottery tickets such as scratcher cards, to automatically track inventory and prevent or limit loss. The described techniques can also be used in other contexts where it is useful to track inventory of sequentially labeled items. The various techniques described herein can be implemented singly, or in any suitable combination with one another.

Various embodiments described herein employ an automated system that can be implemented, for example, using an Internet-connected device communicatively coupled to a sensor, such as a scanner. The device may also (optionally) be communicatively coupled to a point-of-sale (POS) register, for example via a wired or wireless communication path. Data captured by the barcode scanner passes through the device before reaching the POS register; such data may be modified and/or selectively relayed to the POS register and/or to a server or other device, and/or it may be blocked from transmission to the POS register, depending on the current mode of operation and/or on other factors.

In at least one embodiment, the same scanner can be used for ordinary sales (by scanning UPCs) and for inventory audits (by scanning unique barcodes). The device can therefore have two modes: a sales mode, in which UPCs are scanned, and an inventory audit mode, in which unique barcodes are scanned. In at least one embodiment, a cashier or other employee can explicitly trigger a mode switch. Alternatively, the device can detect whether a cashier is attempting to scan UPCs or unique barcodes, and automatically switch between the sales mode and the inventory audit mode based on such detected attempts. Alternatively, the device can operate without modes, and can interpret each scan appropriately, for example by relaying barcodes representing ordinary sales (such as UPCs) to the POS register, while blocking unique barcodes from reaching the POS register and using such unique barcodes to track inventory.

In sales mode, when a scratcher card is sold, the cashier uses the scanner to scan the scratcher card's UPC as usual; the data represented by the UPC is relayed to the POS register, and the sale is recorded.

In inventory audit mode, the cashier uses the scanner to scan unique barcodes rather than UPCs. For example, the cashier can scan the unique barcode on the next unsold scratcher card in a stack. Scanned barcodes are blocked from transmission to the POS register, so as to avoid error messages at the POS register. The information from the scanned unique barcodes can be compared with previously scanned unique barcodes to determine how many scratcher cards have been sold, and to check inventory.

In another embodiment, the cashier may scan unique barcodes, rather than UPCs, during scratcher card sales transactions. The system or device can then record ticket numbers associated with unique barcodes of scratcher cards in real-time (i.e., as they are being sold). At the time of sale, in response to the scan of the unique barcode for a scratcher card, the device looks up UPC data for the scratcher card, and relays the UPC data to the POS register, so that the POS register can process the sale as though the UPC was scanned directly. The device blocks the unique barcodes themselves from reaching the POS register.

In this embodiment, the unique barcodes captured by the device can be used to track ticket inventory. Such tracking can be performed locally at the device; alternatively, the device can transmit data representing scratcher card ticket numbers to a server or other device, for tracking, processing, and generating reports, as described in more detail herein. In this manner, the system can immediately alert the retailer if any ticket numbers were skipped.

Particular examples, applications, and variations are described in more detail below.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

FIG. 6 depicts an example of a shift report for tracking sales of scratcher cards.

DETAILED DESCRIPTION OF THE EMBODIMENTS

Figure 1:
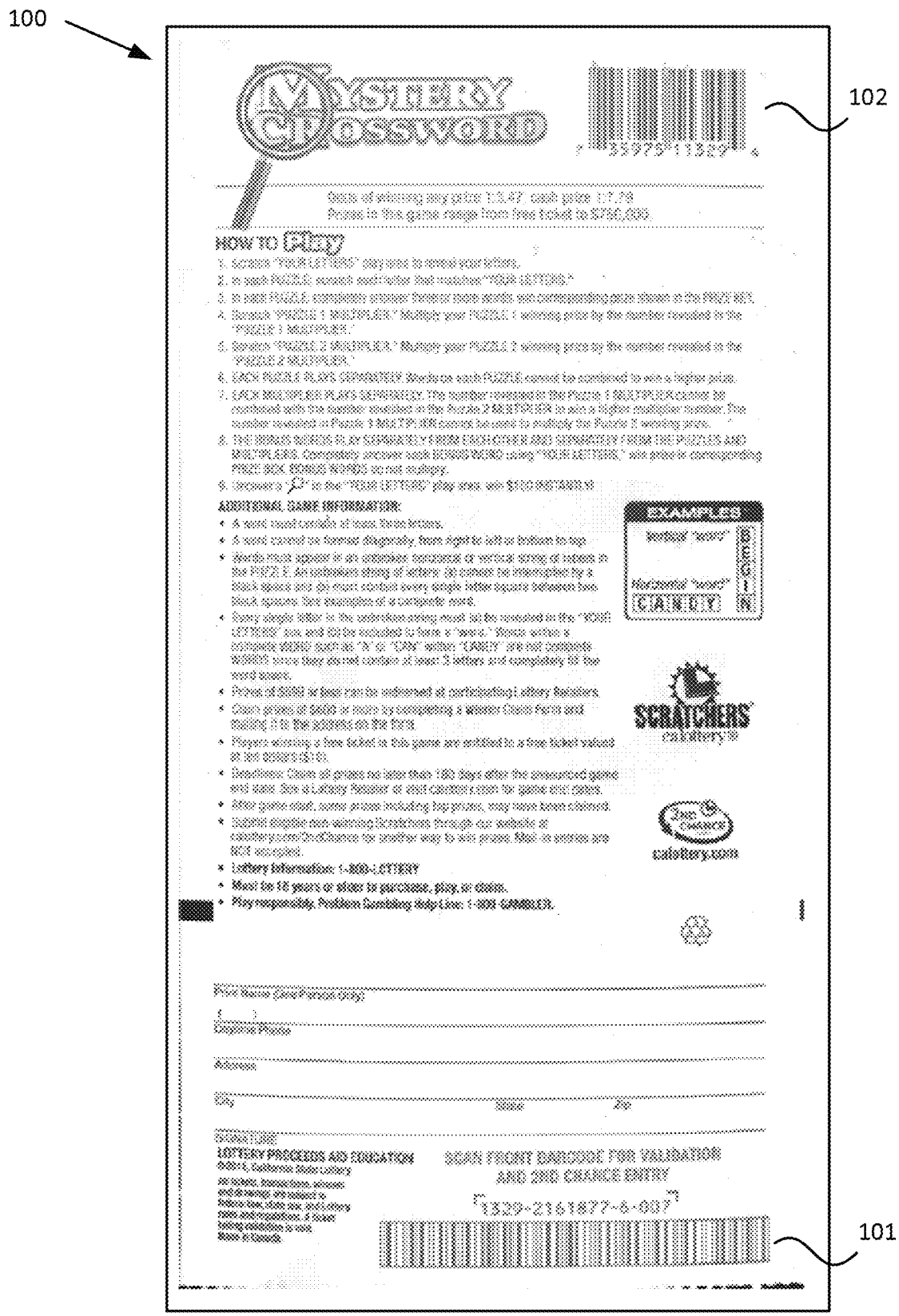
FIG. 1 is an example of a scratcher card, including a unique barcode and a non-unique UPC.

Described herein are various techniques for improved inventory management for products such as lottery scratcher cards, and for improved detection and prevention of loss of such products. Such techniques replace conventional approaches for manually taking inventory after each work shift, which may be cumbersome, inaccurate, and unreliable. In at least one embodiment, an inventory audit mode is provided, wherein a sensor, such as a barcode scanner, can be used for scanning unique barcodes of scratcher cards. In at least one other embodiment, the scanner is used to scan unique barcodes at the time of sale of each scratcher card, so as to enable real-time inventory tracking; the retailer can then be alerted if any ticket numbers were skipped.

For illustrative purposes, the description herein is set forth in the context of a method and system for using a scanner to read barcodes of scratcher cards at a retail point of sale, and thereby provide improved inventory tracking functionality. However, one skilled in the art will recognize that the described techniques can be applied in connection with other types of tickets and/or products, including any such items that have unique machine-readable codes such as barcodes, and in any context in which items are to be tracked and/or inventoried.

Additionally, although the description references optical barcodes readable by a scanner, the system can operate with any other types of machine-readable codes or media, such as magnetic codes, RFID chips, and/or the like, and/or any combination thereof. Thus, the terms "scanner" or "barcode scanner" as used herein can be considered to refer to any type of sensor capable of reading any type of data; such data may be unique to individual items or common among a group of items. Such sensors may detect optical data, magnetic data, RFID data, and/or any other type of data. In addition, the terms "scratchers", "scratcher cards", "lottery tickets", and "tickets" are used interchangeably herein.

For ease of description, the term "product barcode" refers to a barcode (or other machine-readable code) that represents a type of product; an example is a universal product code (UPC). The term "unique barcode" refers to a barcode (or other machine-readable code) that represents a single instance of a product; an example is a barcode that identifies a particular lottery ticket.

Referring now to FIG. 6, there is shown an example of a shift report 600 for tracking sales of scratcher cards. In this example, shift report includes rows for tracking several different games. For each game (row), the following information is shown: a game number (column 603); game dollar value (column 604); and game name (column 605).

A cashier filling out shift report 600 provides his or her name 601 and the date 602. At the beginning of a shift, the cashier records the starting ticket number in column 606. At the end of the shift, the cashier records the ending ticket number in column 607. The difference between starting and ending ticket numbers is (theoretically) the number of tickets for that game that were sold during that shift; this number can be recorded in column 608. A total dollar value for the sold tickets can be recorded in column 609. Totals for all games can be entered in boxes 610 and 611.

A manager, cashier, or other employee/owner can then verify the information entered in shift report 600, by comparing it with a report printed from a point-of-sale (POS) register. Alternatively, the beginning inventory and ending inventory can be scanned using a separate scanner to log the information as to how many tickets were sold, and that information can be stored, for example at a remote server.

As is evident from this example, such techniques may yield inaccurate results because of the inherent imprecision of manually recording start and end numbers for each batch of scratcher cards. In addition, such manual approaches are time-consuming, error-prone, and cumbersome.

Accordingly, the techniques described herein provide improved accuracy and precision for tracking scratcher card inventory, while reducing the burden required. In addition, one skilled in the art will recognize that the systems and methods described herein may be implemented in a wide variety of other contexts, for different types of products, and using other hardware and/or software arrangements. In addition, the techniques described herein can be applied in non-retail settings as well as retail settings. Therefore, the particular techniques described herein are provided merely for illustrative purposes.

System Architecture

According to various embodiments, the systems and methods described herein can be implemented on any electronic device or set of interconnected electronic devices, including any device or combination of devices for performing operations such as scanning barcodes, processing and/or storing scanned information, transmitting such information, receiving user input, and providing output. Such devices may communicate with one another using any suitable scheme for electronic communication, whether wired or wireless, and may further communicate with one or more servers and/or cloud-based devices. Such communication may take place over the Internet and/or any other electronic network.

In various embodiments, the electronic devices may include, for example, any suitable combination of a computing device, point-of-sale (POS) register, scanner, desktop computer, laptop computer, smartphone, voice-enabled device, smart speaker, server, tablet computer, smart headphones, Internet-connected device, and/or the like. Some devices used in connection with the system described herein may be designated as client devices, which are generally operated by end users, while other devices are designated as servers, which generally conduct back-end operations and communicate with client devices (and/or with other servers and/or other components) via a communications network such as the Internet. In at least one embodiment, the methods described herein can be implemented in connection with a cloud computing environment using techniques that are known to those skilled in the art.

In addition, one skilled in the art will recognize that the techniques described herein can be implemented in other contexts, and indeed in any suitable device, set of devices, or system capable of interfacing with existing retail POS registers, e-commerce systems, inventory management systems, and/or data storage systems. Accordingly, the following description is intended to illustrate various embodiments by way of example, rather than to limit scope.

Figure 2:
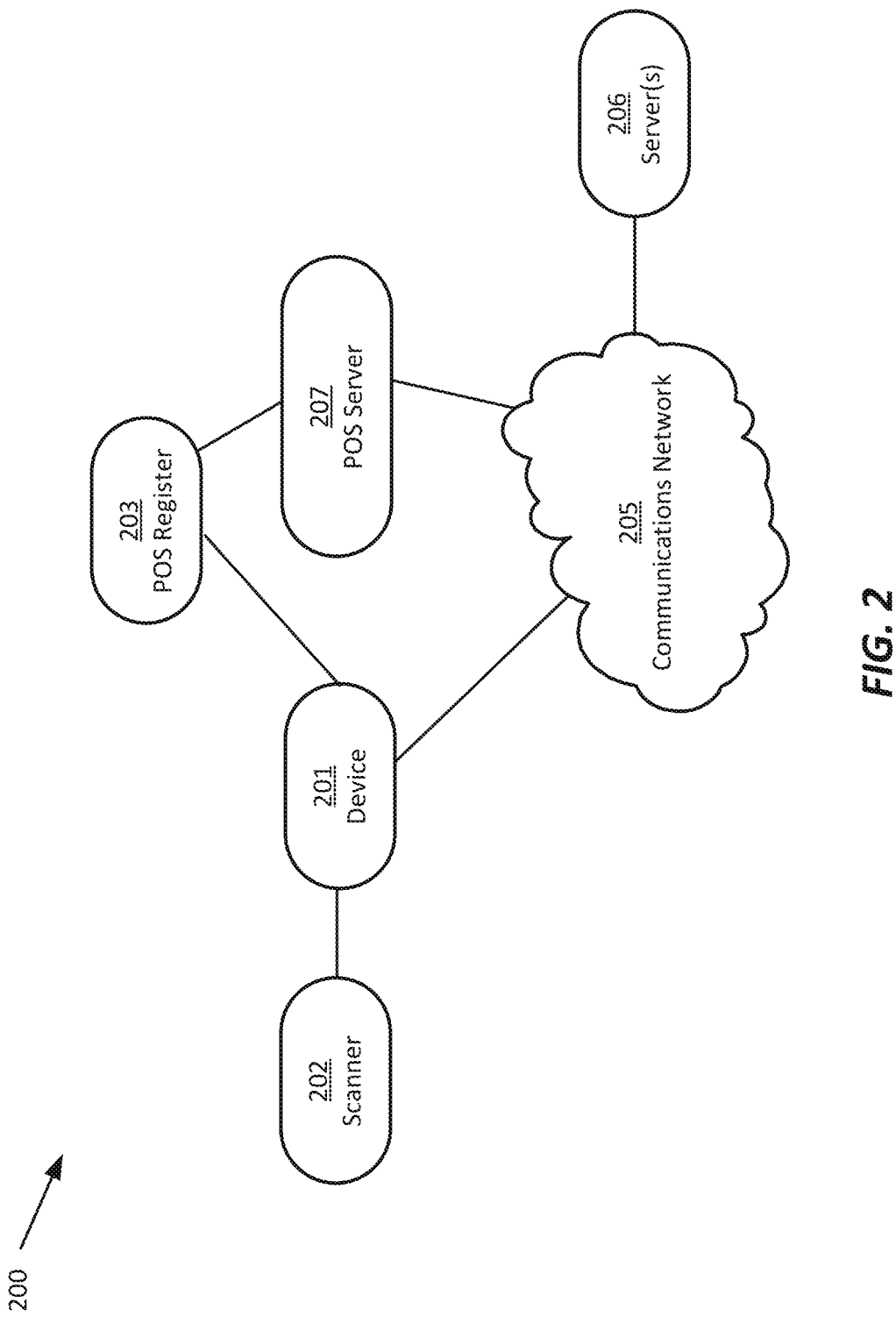
FIG. 2 depicts an example of an architecture in which a device is communicatively coupled to a scanner and to a POS register, according to one embodiment.

Referring now to FIG. 2, there is shown an architecture for a system 200 for implementing the described techniques according to one embodiment. Device 201 is communicatively coupled to scanner 202 and point of sale (POS) register 203, for example via a wired or wireless communication path, using any suitable communication protocol. Scanner 202 may be, for example, an optical scanner suitable for reading barcodes imprinted on products and/or packaging. Examples of scanner 202 include the Honeywell Xenon 1900 series, Orbit series, and various models available from Datalogic and Motorola. POS register 203 may be any suitable POS register or device that is capable of processing retail transactions according to techniques that are known in the art. Examples of POS register 203 include Gilbarco Passport, Verifone Ruby2, Verifone Ruby-ci, NCR Registers, and Radiant.

In at least one embodiment, device 201 also communicates with POS server 207, either via communications network 205 or via some other direct communication channel between device 201 and POS server 207. In at least one embodiment, POS server 207, or some other component such as a computer connected to POS server 207, can run a driver, software application, and/or software agent that performs some or all of the functionality described herein.

During operation of system 200, device 201 communicates with both scanner 202 and POS register 203, for example to receive signals from scanner 202 representing scanned barcodes and/or UPCs, and to transmit signals to POS register 203 representing scanned barcodes and/or UPCs. Device 201 may also communicate with server(s) 206 via communications network 205 or any other means, for example to transmit data that can be used for generating inventory reports and the like.

Communication between device 201 and other components can take place over any suitable means, whether wireless or wired. For example, in at least one embodiment, device 201 may include Bluetooth capability that enables a wireless connection with scanner 202 and/or POS register 203. Alternatively, any other wired or wireless communications scheme can be used.

Using an architecture such as that depicted in FIG. 2, data sent from scanner 202 passes through device 201 before reaching POS register 203. In effect, this gives device 201 an opportunity to intercept data from scanner 202 before such data is seen by POS register 203. As described in more detail below, this arrangement allows device 201 to block, process, and/or otherwise modify or manipulate barcode data received from scanner 202 before such data reaches POS register 203, and thereby enables the functionality described herein.

In at least one embodiment, as described below, the same scanner 202 may be used to scan UPCs 102 of scratcher cards 100 during normal sales, and to scan unique barcodes 101 during inventory audits (which are then blocked from transmission to POS register 203). In another embodiment, as also described below, scanner 202 may be used to scan unique barcodes 101 during normal sales; device 201 may then process such unique barcodes 101 to generate and send to POS register 203 a signal that simulates the scanning of UPC 102 corresponding to the scanned unique barcode 101.

In at least one embodiment, device 201 may also be connected to one or more server(s) 206, via any suitable communications network 205 such as the Internet. Such connectivity allows device 201 to upload data to server(s) 206, where such data can be used for inventory tracking, report generation, and/or other processing, as described in more detail herein. In at least one embodiment, device 201 may be connected to POS register 203 via a port (not shown) that receives information related to transaction details, such as products being added or removed, and/or payment being collected. In this manner, the system is able to obtain detailed transactional data, such as products being added or removed, as well as payment confirmation. In at least one embodiment, device itself 201 may capture such information from POS register 203, for example via a port on POS register 203 that provides detailed transactional data.

In at least one embodiment, device 201 can interface with a user's smartphone or other electronic device (not shown). Dynamic, step-by-step instructions can be provided on the display screen of the smartphone or other electronic device, for example to help the user perform setup and/or installation of device 201. The interface with the user's smartphone or other device may also be sued for performing operations such as, for example, mode selection, inventory audit steps, and/or other operations.

In at least one embodiment, device 201 can be configured to automatically and regularly (e.g., on a daily basis) check with server(s) 206 to determine whether any software updates or data updates are available; such updates may include software updates to improve functionality or security, and/or data updates such as new scratcher card barcodes, mapping data, and/or the like. If any software updates or data updates are available, device 201 automatically downloads and/or installs the new updates. In at least one embodiment, the user may be prompted to approve the download before it takes place or before updated software is installed.

The particular arrangement depicted in FIG. 2 is merely exemplary. In various alternative embodiments, device 201 can be integrated into scanner 202, or into POS register 203. In such integrated embodiments, the system may function as described herein without the need for device 201 to be provided as a separate component as depicted in FIG. 2.

Figure 7:
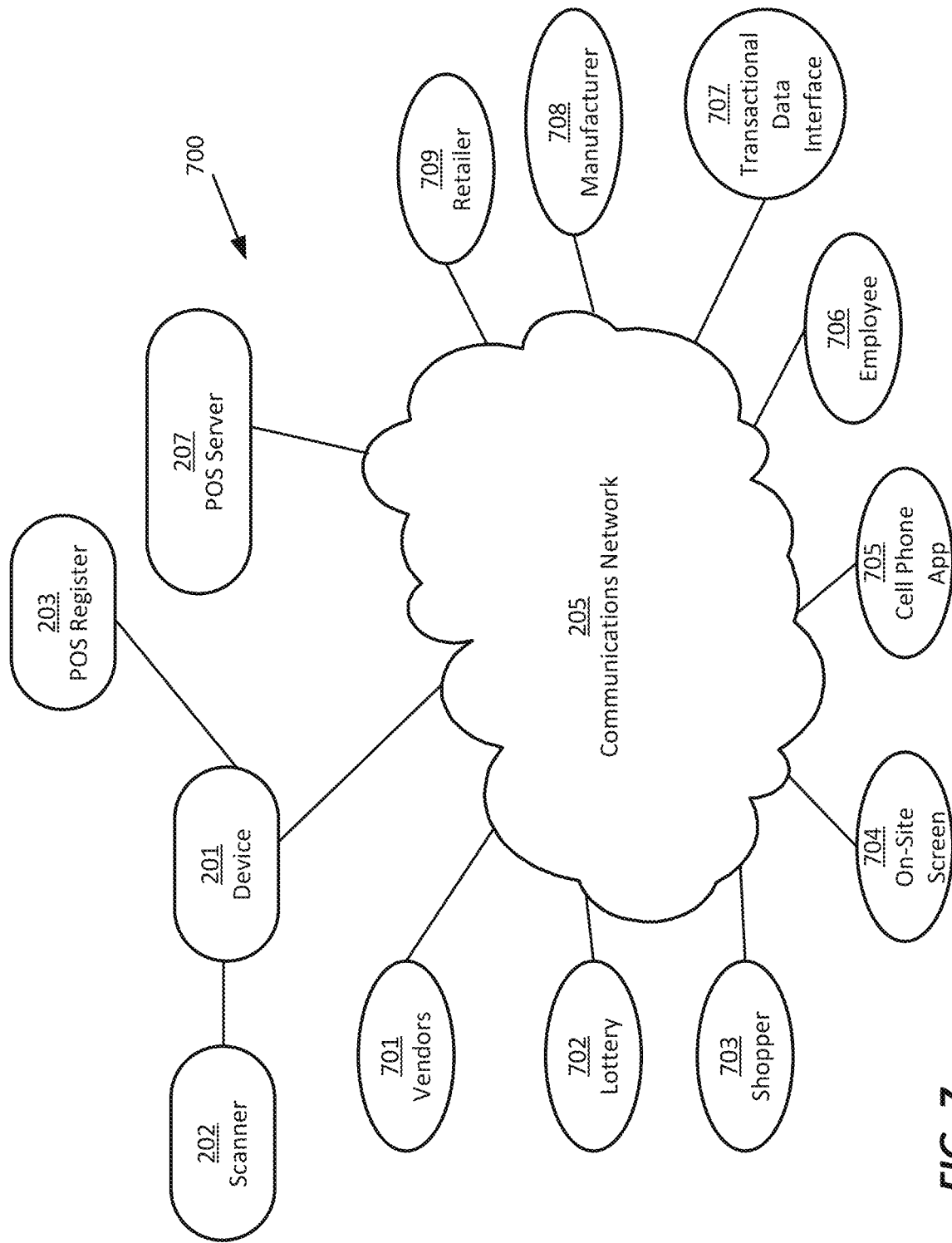
FIG. 7 is a block diagram depicting various connections enabled by the architecture described herein, according to various embodiments.

Referring now to FIG. 7, there is shown a block diagram 700 depicting various connections enabled by the architecture described herein, according to various embodiments. The various connections depicted in FIG. 7 are merely exemplary, and can be implemented singly or in any suitable combination. For example, device 201 can be communicatively coupled, via communications network 205 such as the Internet, to any or all of:

Vendor(s) 701;
Lottery system(s) 702;
Shopper(s) 703 (i.e., retail customers);
On-site display screen(s) 704, so as to provide communication from device 201 to shopper(s) 703, employee(s) 706 (such as cashiers), and/or retailer(s) 709;
Cell phone app(s) 705, so as to provide communication from device 201 to shopper(s) 703, employee(s) 706 (such as cashiers), and/or retailer(s) 709;
Employee(s) 706 of the retail store in which device 201 is installed (such as cashiers, managers, and/or the like);
Transactional data interface(s) 707, which may include any system for collecting and/or providing additional information about transactions, including for example an interface to a surveillance system;
Manufacturer(s) of products 708; and
Retailer(s) 709.

The various connections depicted in FIG. 7 can be used to enable many different applications and functions, including for example:

Inventory tracking and management;
Bill payment;
Promotions;
Marketing;
Loyalty; and
Gamification.

Several of these applications will be described in more detail herein.

Figure 3A:
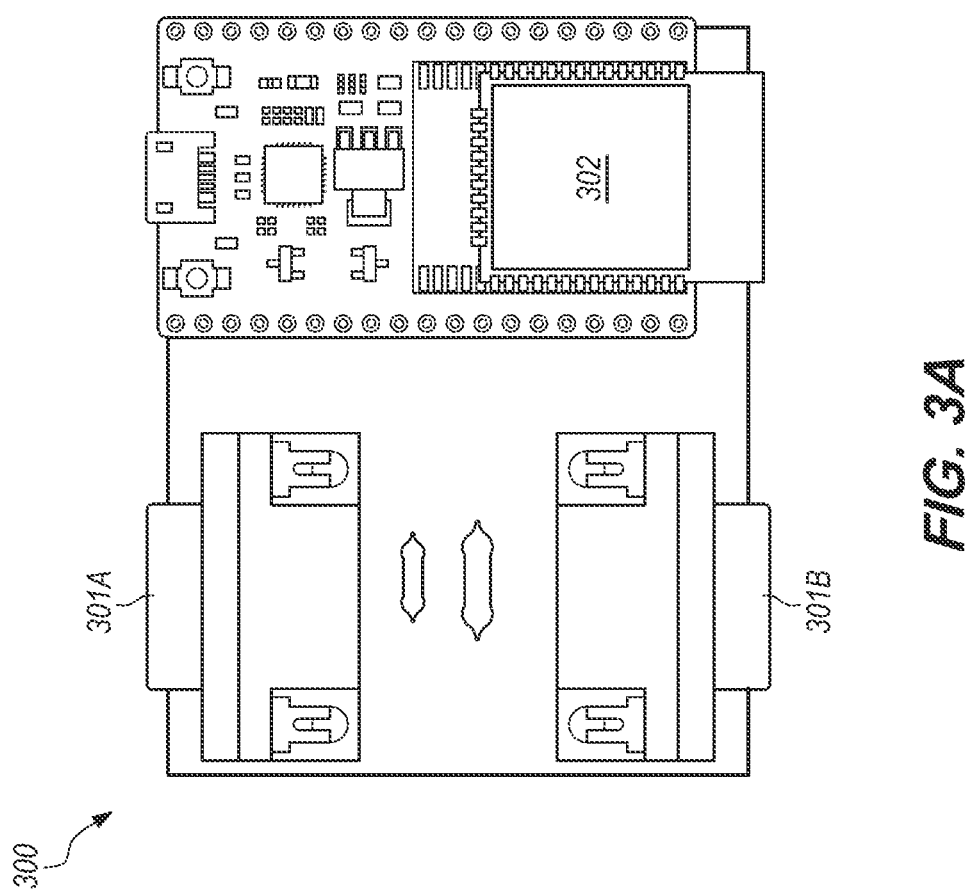
FIGS. 3A through 3C depict examples of circuit boards for a device that implements the techniques described herein, according to various embodiments.
Figure 3B:
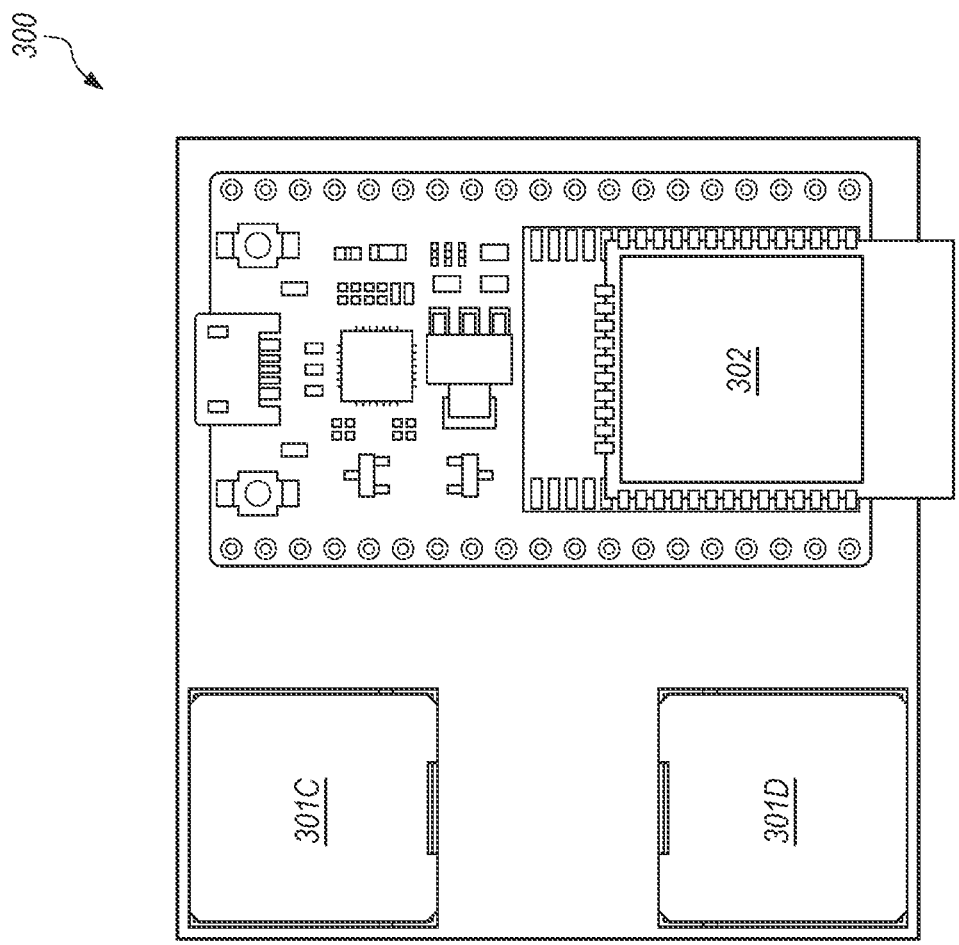
Figure 3C:
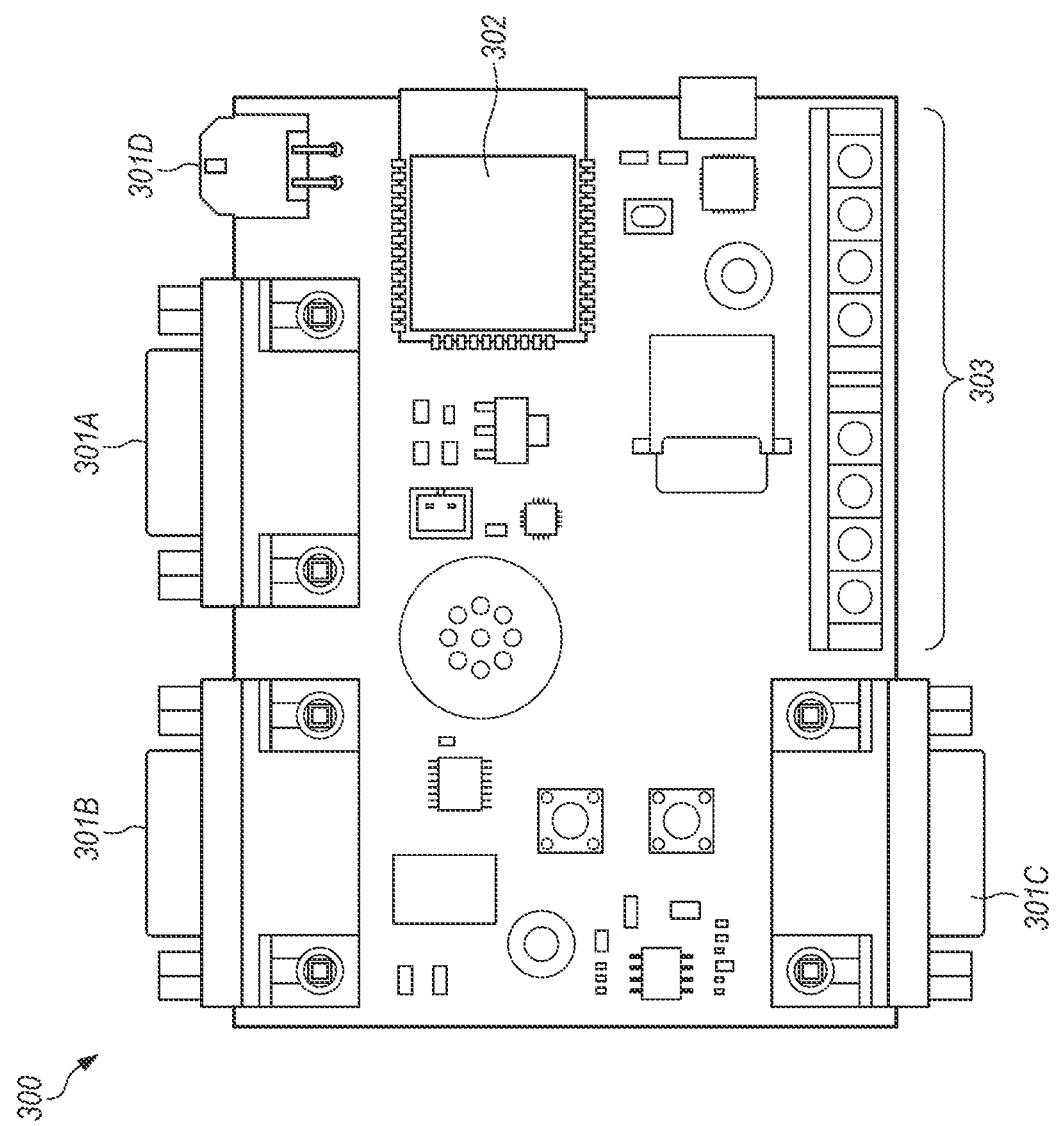

Referring now to FIGS. 3A through 3C, there are shown examples of circuit boards for device 201 that implements the techniques described herein according to various embodiments, as follows.

FIG. 3A depicts a top view of an embodiment of circuit board 300 for device 201 configured to connect to barcode scanners 202 that use a DE-9 connector (often referred to as a DB-9 connector). Connector 301A connects to POS register 203, via a cable (not shown), and connector 301B connects to scanner 202, via another cable (not shown). In the depicted embodiment, both connectors 301A, 301B are DE-9 connectors; however, any suitable connector for enabling electronic communication can be used, whether wired or wireless.

FIG. 3B depicts a top view of an embodiment of circuit board 300 for device 201 configured to connect to barcode scanners 202 that use an RJ45 connector. Connector 301C connects to POS register 203, for example via an Ethernet cable or other cable that uses an RJ45 connector (not shown), while connector 301D connects to scanner 202, via another Ethernet cable or other cable that uses an RJ45 connector (not shown).

FIG. 3C depicts a top view of an embodiment of circuit board 300 for device 201 configured to connect to barcode scanners 202 that use a DE-9 connector (often referred to as a DB-9 connector), and further configured to connect to another device for obtaining transactional data. Connector 301A connects to POS register 203, connector 301B connects to scanner 202, and connectors 301C and 301D connect to another device for obtaining transactional data, such as for example a surveillance device. Suitable cables (not shown) can be used for establishing such connections. In the depicted embodiment, connectors 301A, 301B, and 301C are DE-9 connectors; however, any suitable connector for enabling electronic communication can be used, whether wired or wireless.

Also shown in FIG. 3C are additional optional components, such as status indicators 303, which may be implemented as LEDs or using any other suitable technology, and speaker 304, which may provide audio output such as beeps, alerts, and/or speech output.

In at least one embodiment, in any of the examples depicted in FIGS. 3A through 3C, processor 302 may run software for implementing the techniques described herein.

One skilled in the art will recognize that the architectures and arrangements show in FIGS. 3A through 3C are merely exemplary, and that other configurations, arrangements, and connection protocols can be used, including for example a USB connection, BlueTooth connection, and/or other type(s) of connections.

Barcodes

For exemplary purposes, the system and method described herein are presented in terms of techniques for scanning scratcher cards, such as scratcher card 100 depicted in FIG. 1. Specifically, the described techniques can be used to scan scratcher cards that have at least two different machine-readable barcodes, including unique barcode 101 representing a ticket number that is unique for each scratcher card, and UPC 102 that represents the type of game or product. As mentioned above, in general, UPCs 102 are not unique; rather they are usually the same for all scratcher cards of a given game or type.

Referring again to FIG. 1, there are shown examples of unique barcode 101 and UPC 102 on scratcher card 100. UPC 102, shown at the top of the scratcher card 100, is of the same form as would conventionally be scanned in connection with a sale of a product. UPC 102 is typically a non-unique code; in the context of scratcher cards, the same UPC 102 would appear on all scratcher cards of a given game or type. For example, every Mystery Crossword scratcher card (Game #1329) would have the same UPC 102. In the example shown in FIG. 1, UPC 102 is a 12-digit barcode.

Unique barcode 101, shown at the bottom of scratcher card 100, can be scanned for inventory control, for example at the close of each shift, so as to track which scratcher card ticket is to be sold next within a pack.

Unique barcode 101 can be in any suitable form; in the example of FIG. 1, it is in the form of an ITF (Interleaved 2 of 5) barcode. More specifically, in this example, unique barcode 101 represents three main identifying number sequences that total 15 digits, as follows: Game #-Pack #-Ticket # (e.g., 1329-2161877-6-007).

Game #: This number identifies each game. For example, in California there may be between 45-50 games at any given time, so that there are 45-50 unique game numbers (these quantities may change from time to time).

Pack #: Scratcher card games are distributed in packs. Each pack has a certain quantity of the same game. The quantity can change based on the value of the games. For example, $1 tickets may have 250 tickets in each pack, while $30 tickets may have 30 games in each pack. Each pack sold in California has its own different unique number.

Ticket #: This is a 3-digit number that ranges from 000-249, based on the number of tickets in the pack. The first ticket is numbered 000 and the last ticket is numbered N−1, where N is the number of tickets in the pack. The ticket numbers are sequential, and tickets may be attached to one another by perforated edges. Stores can sell tickets in any order, but most start from the end of the pack and go from the last ticket to the first, or start from the beginning of the pack and go from the first to the last, thus leading to consecutive ticket sales.

For example, two consecutive scratcher cards in the same pack would have the same game number and pack number, but would have consecutive ticket numbers (e.g. 006 and 007).

Figure 5:
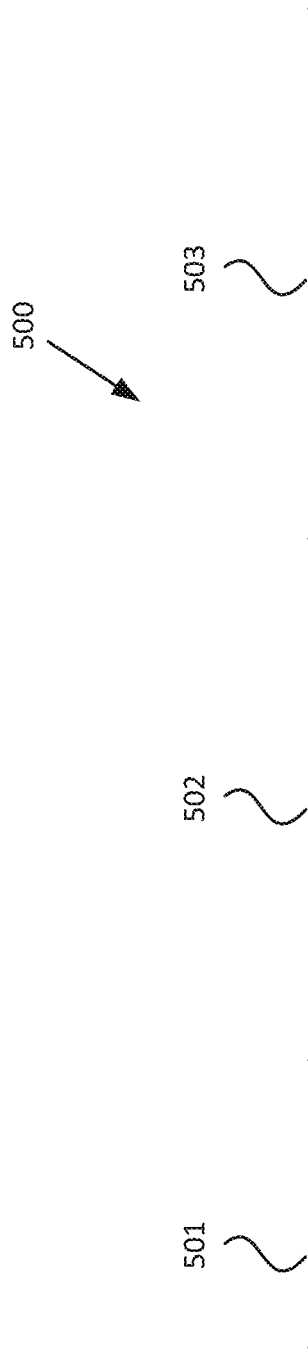
FIG. 5 depicts an example of a breakdown showing how many scratcher cards are in each pack for games of different values.

Referring now to FIG. 5, there is shown an example of a breakdown 500 showing how many tickets are in a pack for games of different values. For each game value 501, a ticket number range 502 is shown, along with the number 503 of tickets in each pack. For example, $1 games may include 250 tickets per pack, with ticket numbers ranging from 000-249. The particular breakdown 500 is exemplary, and may be subject to change from time to time.

Methods of Operation

Figure 4:
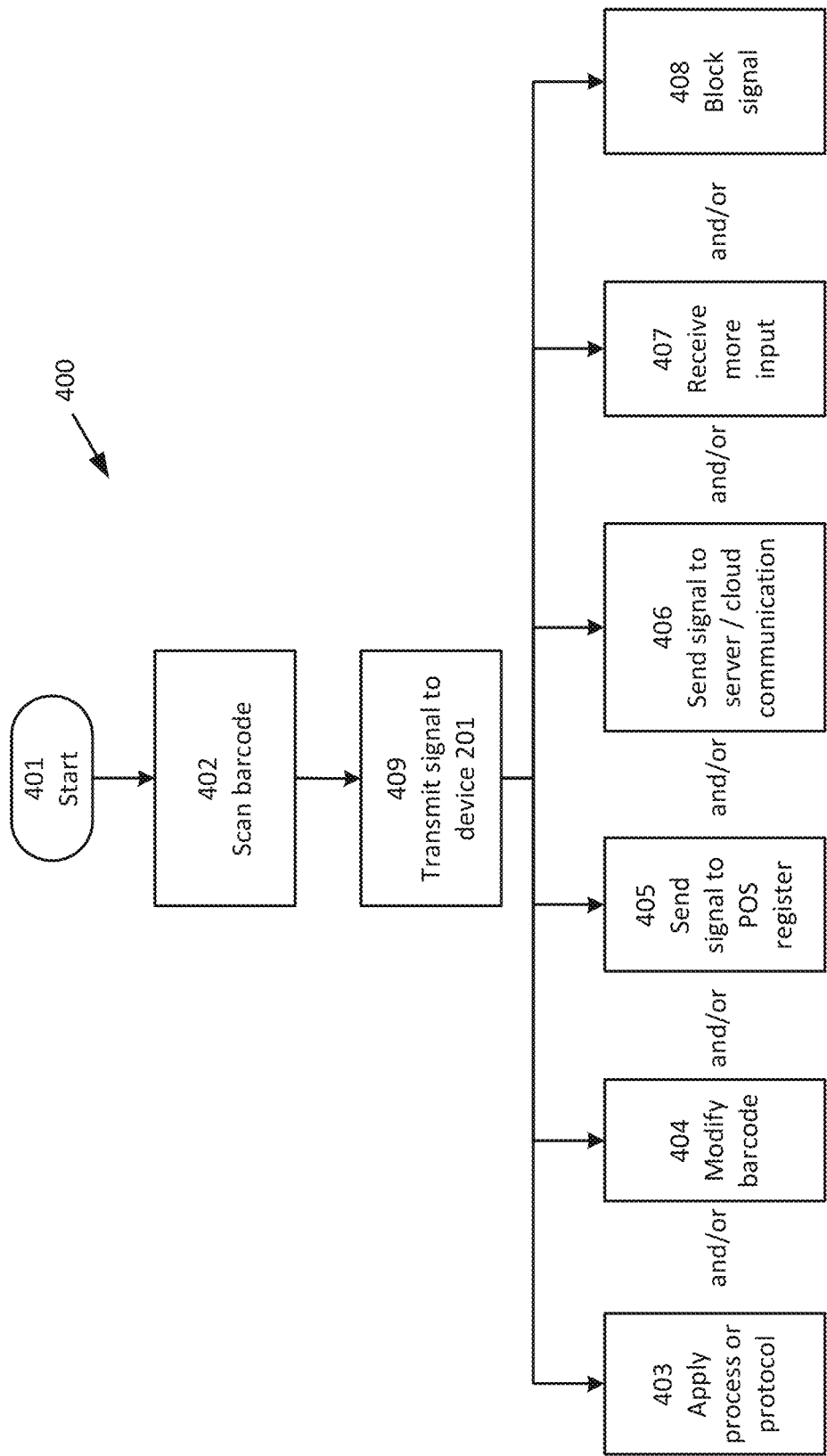
FIG. 4 is a flowchart depicting an overall method for processing scanned barcodes in various ways, and selectively blocking transmission of such barcodes, according to one embodiment.

Referring now to FIG. 4, there is shown a flowchart depicting an overall method 400 for processing scanned barcodes in various ways, and selectively blocking transmission of such barcodes, according to one embodiment. In at least one embodiment, method 400 may be performed using an apparatus such as that depicted in FIG. 2, including scanner 202, device 201, and POS register 203, along with any other components. However, one skilled in the art will recognize that method 400 can be implemented using any suitable architecture.

The method depicted in FIG. 4 may be performed whenever barcodes are scanned, whether they are unique barcodes 101, UPCs 102, or other barcodes. Such scanning may occur, for example, during inventory audits and/or in the course of ordinary sales. In at least one embodiment, as mentioned above, two operating modes may be provided: a sales mode and an inventory audit mode. The same scanner 202 may be used to scan UPCs 102 of scratcher cards 100 (and/or other products) while in sales mode, and to scan unique barcodes 101 while in inventory audit mode. For example, in at least one embodiment, prior to scanning 402 unique barcodes 101, the system may be placed in inventory audit mode, wherein the system processes scanned unique barcodes 101 in the manner described herein so as to track inventory and detect missing scratcher cards 100. In at least one embodiment, the cashier or other employee can explicitly invoke inventory audit mode by entering a command, flipping a switch, pressing a button, scanning a designated barcode, or performing some other input operation. Alternatively, the system can automatically enter inventory audit mode when it detects scanning of a series of unique barcodes 101 of scratcher cards 100 (as opposed to scanning of UPC codes 102 as would normally take place during the sales process). In at least one embodiment, the system can automatically enter inventory mode as soon as it detects that a unique barcode 101 has been scanned; the signal representing unique barcode 101 is immediately blocked (i.e., not sent to POS register 203.

In at least one embodiment, when the system is in audit mode, device 201 blocks the signal from reaching POS register 203. This prevents unwanted error alerts caused by POS register 203 not recognizing unique barcodes 101.

In other embodiments, scanner 202 may be used to scan unique barcodes 101 during normal sales. Device 201 may then process such unique barcodes 101 to generate a signal to POS register 203 that simulates the scanning of UPC 102. For example, device 201 may look up a UPC 102 corresponding to scanned unique barcode 101, and send a signal representing that UPC 102 to POS register 203. If the cashier mistakenly scans a scratcher card's 100 UPC 102 instead of unique barcode 101, device 201 may block the signal representing UPC 102 from reaching POS register 203, and may issue an alert, error message, beep, or the like, to remind the cashier to scan unique barcode 101 instead.

The method begins 401. A cashier or other user uses scanner 202 to scan 402 a barcode, such as for example unique barcode 101 of scratcher card 100, UPC code 102, or any other barcode. As mentioned above, in various embodiments, step 402 may take place during an inventory audit, or during a normal sale of scratcher card 100. If the scanned barcode is a UPC code 102, device 201 can send 405 a signal representing UPC code 102 to POS register 203.

Once the barcode has been scanned 402, a signal representing the scanned barcode is transmitted 409 to device 201. Device 201 then performs any or all of steps 403 through 408, including:

Applying 403 any suitable process or protocol;
Modifying 404 or manipulating the scanned barcode;
Sending 405 signal representing the scanned barcode (or a corresponding UPC 102) to POS register 203, either in unmodified or modified form;
Sending 406 signal representing the scanned barcode to server(s) 206, for example via communications network 205 (this may include performing any other suitable cloud-based or network-based communication);
Receiving 407 additional input, for example by prompting the user and receiving input via an input device; and/or
Blocking 408 the signal representing the scanned barcode from being transmitted to POS register 203.

If the scanned barcode is a UPC code 102, device 201 can send 405 a signal representing UPC code 102 to POS register 203.

For example, in an embodiment wherein unique barcodes 101 are scanned during inventory audits only, device 201 can, upon receiving a signal representing a scanned unique barcode 101, perform step 406 to send a signal representing scanned barcode 101 to server(s) 206 to perform inventory tracking operations, while blocking 408 the signal representing the scanned barcode from being transmitted to POS register 203.

As another example, in an embodiment wherein unique barcodes 101 are scanned during normal sales, device 201 can, upon receiving a signal representing a scanned unique barcode 101, perform steps, 404, 405, 406, and 408. Specifically, device 201 can look up UPC 102 corresponding to scanned unique barcode 101, and can send 405 a signal representing UPC 102 to POS register 203 so that register 203 rings up a normal sale and completes the transaction. This step of looking up UPC 102 corresponding to scanned unique barcode 101 can be performed by device 201, either on its own (using locally stored data) or by sending and receiving data from server(s) 206. Device 201 can also send 406 a signal representing scanned barcode 101 to server(s) 206 to perform inventory tracking operation. Device 201 can also block 408 the signal representing scanned barcode 101 from reaching POS register 203 so that POS register 203 does not receive a signal it does not recognize. Thus, in such an embodiment, based on a scan of a single barcode 101, the system can enable tracking of the time of sale as well as scratcher card inventory in real-time, while also providing POS register 203 with a UPC that it can use to complete the sales transaction.

Upon receiving the signal representing scanned barcode 101, server(s) 206 may perform inventory tracking operations. For example, in at least one embodiment, server(s) 206 may run software to interpret and track the number encoded in received barcode 101, and compare it to previously tracked barcode numbers. Any desired reports can be generated and output, for example to management or other stakeholders. Missing numbers, if any, can be detected, and inventory can be accurately tracked.

In at least one embodiment, once the barcode has been scanned 402 and a corresponding signal transmitted 409 to device 201, device 201 can automatically determine whether a signal representing barcode 101 (or a corresponding UPC) should be sent to POS register 203, and whether a signal representing barcode 101 should also be sent to server(s) 206. Based on this determination, device 201 transmits signals representing the code(s) accordingly. Thus, in such an embodiment, there is no need to switch between a sales mode and an inventory audit mode.

Figure 8:
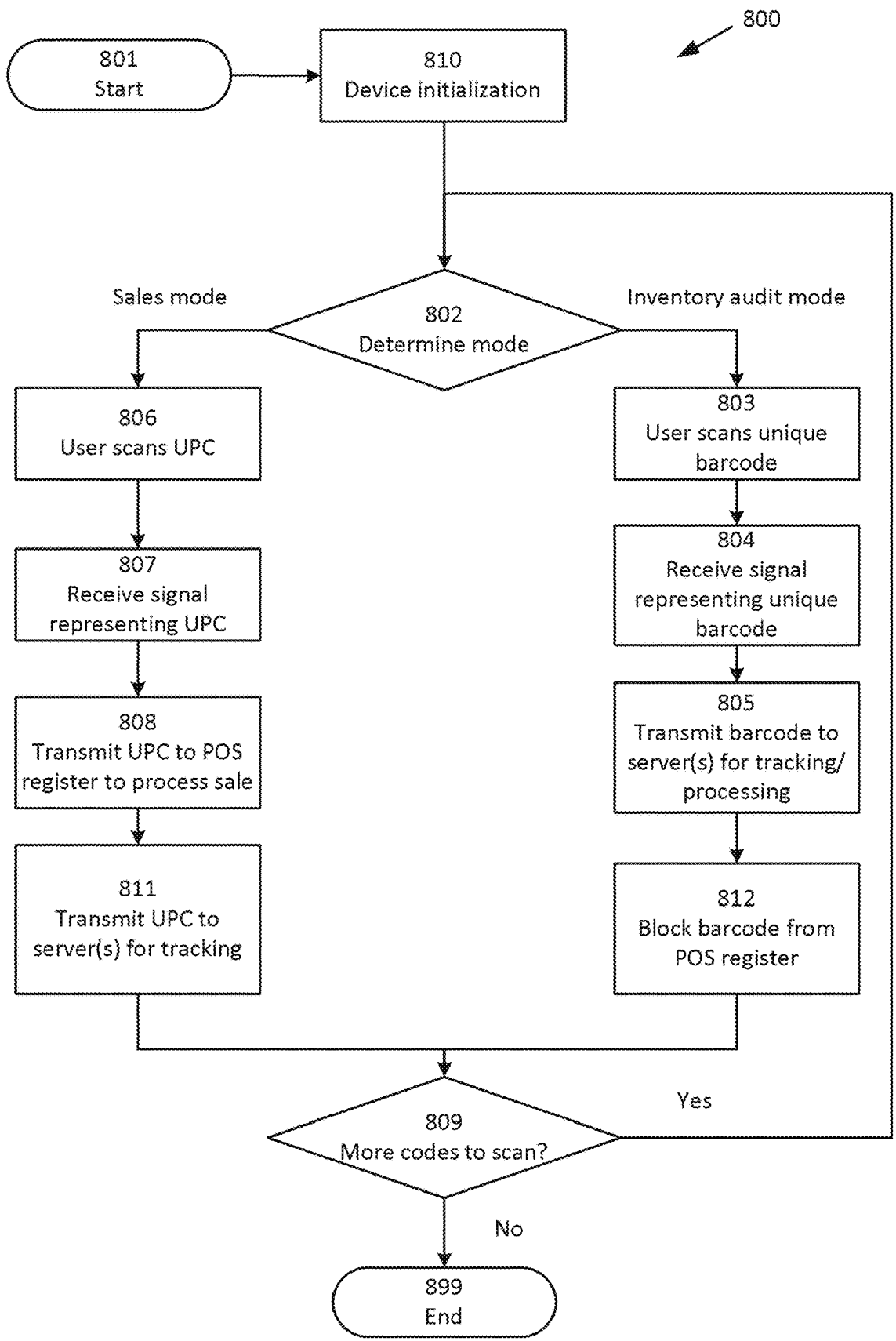
FIG. 8 is a flowchart depicting a method of implementing two modes of operation, including a sales mode for scanning UPCs and an inventory audit mode for scanning unique barcodes, according to one embodiment.

Referring now to FIG. 8, there is shown a flowchart depicting a method 800 wherein two modes of operation can be enabled, including a sales mode for scanning UPCs 102 (or any other barcodes unrelated to scratchers) and an inventory audit mode for scanning unique barcodes 101, according to one embodiment.

The method begins 801. In at least one embodiment, a device initialization step 810 may be performed in which device 201 is powered on. In at least one embodiment, device 201 automatically recognizes the brands of devices being used (including, for example, scanner 202 and POS register 203), and automatically configures itself to communicate with these devices. In at least one embodiment, an indicator, such as an LED lamp, illuminates to confirm that device 201 has established connections with scanner 202 and POS register 203.

In at least one embodiment, the user, who may be a cashier or other employee, may perform steps to register device 201 and to link it to an online account at server(s) 206, so that inventory tracking data can be transmitted to the correct place for analysis and reporting. In at least one embodiment, this link can be established automatically, for example if device 201 has previously been registered and is recognized.

In at least one embodiment, device 201 is able to automatically download new data and/or software updates periodically.

In at least one embodiment, if device 201 is not working properly, or if communications with other components cannot be established, device 201 can default to functioning in a "pass-through" mode, wherein barcode data read by device 201 is relayed to POS register 203 without being blocked, modified, or otherwise processed.

Once device initialization 810 has taken place, device 201 determines 802 a current mode of operation. In at least one embodiment, a user (such as an employee, cashier, or the like) can manually switch between sales mode and inventory audit mode, for example by pressing a button, entering a command on a keyboard, selecting an option from a menu, clicking or tapping on an on-screen button, turning a dial, speaking a command, scanning a mode change barcode with scanner 202, or performing any other input operation. In at least one embodiment, a confirmation message or alert can be output, to indicate that device 201 is in inventory audit mode, for example by audio playing "Inventory audit mode on" or "Inventory audit mode off", or a screen displaying words to that effect. In at least one embodiment, the current mode of operation is maintained until the user specifies a change to another mode, or after a certain amount of time has elapsed with no activity.

In at least one embodiment, device 201 may default to sales mode, but may automatically switch to inventory audit mode, for example if it detects that the user is attempting to scan unique barcodes 101 rather than UPCs 102. In at least one embodiment, device 201 may automatically switch to inventory audit mode when the user attempts to scan a single unique barcode 101. In another embodiment, device 201 may automatically switch to inventory audit mode in response to repeated scans of unique barcodes 101 (for example, after five consecutive scans of unique barcodes 101). In at least one embodiment, if, while in inventory audit mode, the user scans a barcode that does not correspond to a scratcher card, device 201 automatically switches to sales mode.

Any combination of such techniques may be used, for example to enable both automatic and manual mode changes.

In at least one embodiment, whether mode is changed automatically or manually, device 201 may automatically return to sales mode after some period of inactivity, such as a time-out period. Again, an auditory and/or visual indicator of the mode change can be output.

In at least one embodiment, if device 201 determines 802 that the current mode of operation is the sales mode, steps 806 through 808 and 811 are performed. The user uses scanner 202 to scan 806 UPC 102. If the user inadvertently scans unique barcode 101 while in sales mode, scanner 202 may emit a warning beep or other output to indicate the error. Alternatively, scanner 202 may send a signal to cause POS register 203 to emit a warning beep or other output to indicate the error. Any other suitable output can be provided, to indicate the error, including visual, auditory, and/or haptic output. For example, the scanner may vibrate momentarily to alert the user, or a speaker can instruct the cashier to scan UPC 102 instead of unique barcode 101. A display, alert light, and/or beep can be used to reinforce this instruction.

Once the user has scanned 806 UPC 102, device 201 receives 807 a signal from scanner 202 representing UPC 102. Device 201 then transmits 808 a signal to POS register 203 representing UPC 102, so that POS register 203 can process the sale. In at least one embodiment, the signal transmitted 808 by device 201 to POS register 203 is identical to (or virtually identical to) the signal received 807 by device 201 from scanner 202; essentially, device 201 simply relays the signal representing UPC 102 to POS register 203. In other embodiments, the signal transmitted 808 by device 201 to POS register 203 may differ from the signal received 807 by device 201 from scanner 202. In at least one embodiment, device 201 transmits 811 a signal to server(s) 206 representing UPC 102, so that server(s) 206 can track the sale.

In at least one embodiment, if device 201 determines 802 that the current mode of operation is the inventory audit mode, steps 803 through 805 and 812 are performed. Inventory audit mode provides functionality for taking a complete inventory of remaining scratcher cards in stock, by scanning a series of unique barcodes 101 in succession. Accordingly, in at least one embodiment, during inventory audit mode, the system performs inventory-taking functions rather than sales processing. In at least one embodiment, during inventory tracking, data is sent from device 201 to server(s) 206, but is blocked from reaching POS register 203, since POS register 203 is not involved in inventory tracking. Server(s) 206 uses the received inventory tracking information to generate reports regarding scratcher card sales and potential theft.

The user uses scanner 202 to scan 803 unique barcode 101. If the user inadvertently scans UPC 102 while in inventory audit mode, scanner 202 may emit a warning beep or other output to indicate the error. Alternatively, scanner 202 may send a signal to cause POS register 203 to emit a warning beep or other output to indicate the error. Any other suitable output can be provided, to indicate the error, including visual, auditory, and/or haptic output. For example, the scanner may vibrate momentarily to alert the user, or a speaker can instruct the cashier to scan unique barcode 101 instead of UPC 102. A display, alert light, and/or beep can be used to reinforce this instruction.

Once the user has scanned 803 unique barcode 101, device 201 receives 804 a signal from scanner 202 representing unique barcode 101. In at least one embodiment, device 201 then transmits 805 a signal to one or more server(s) 206 representing unique barcode 101, so that software running at server(s) 206 can perform inventory tracking and/or other processing operations, including storing and generating reports. Transmission 805 to server(s) 206 can take place via any suitable communications network 205 such as the Internet, and using any suitable protocol for electronic data transmission. In at least one embodiment, the signal transmitted 805 by device 201 to server(s) 206 is identical to (or virtually identical to) the signal received 804 by device 201 from scanner 202; essentially, device 201 simply relays the signal representing unique barcode 101 to server(s) 206. In other embodiments, the signal transmitted 808 by device 201 to server(s) 206 may differ from the signal received 804 by device 201 from scanner 202. Device 201 blocks 812 barcode 101 from being sent to POS register 203, so as to avoid error messages due to unrecognized barcodes.

Alternatively, device 201 may temporarily store a number of unique barcodes locally, for example in a local data store, and then transmit one or more signals representing a number of barcodes in batched form.

Alternatively, instead of device 201 performing step 805 to transmit unique barcode 101 to server(s) 206, inventory tracking and/or other processing can be performed locally at device 201, or at any other connected device (not shown).

The method then determines 809 whether there are more codes being scanned. Such codes may be UPCs 102 (for scratchers or for other products) or unique barcodes 101. If there are more codes being scanned, the method returns to step 802. Otherwise, the method ends 899.

Figure 9:
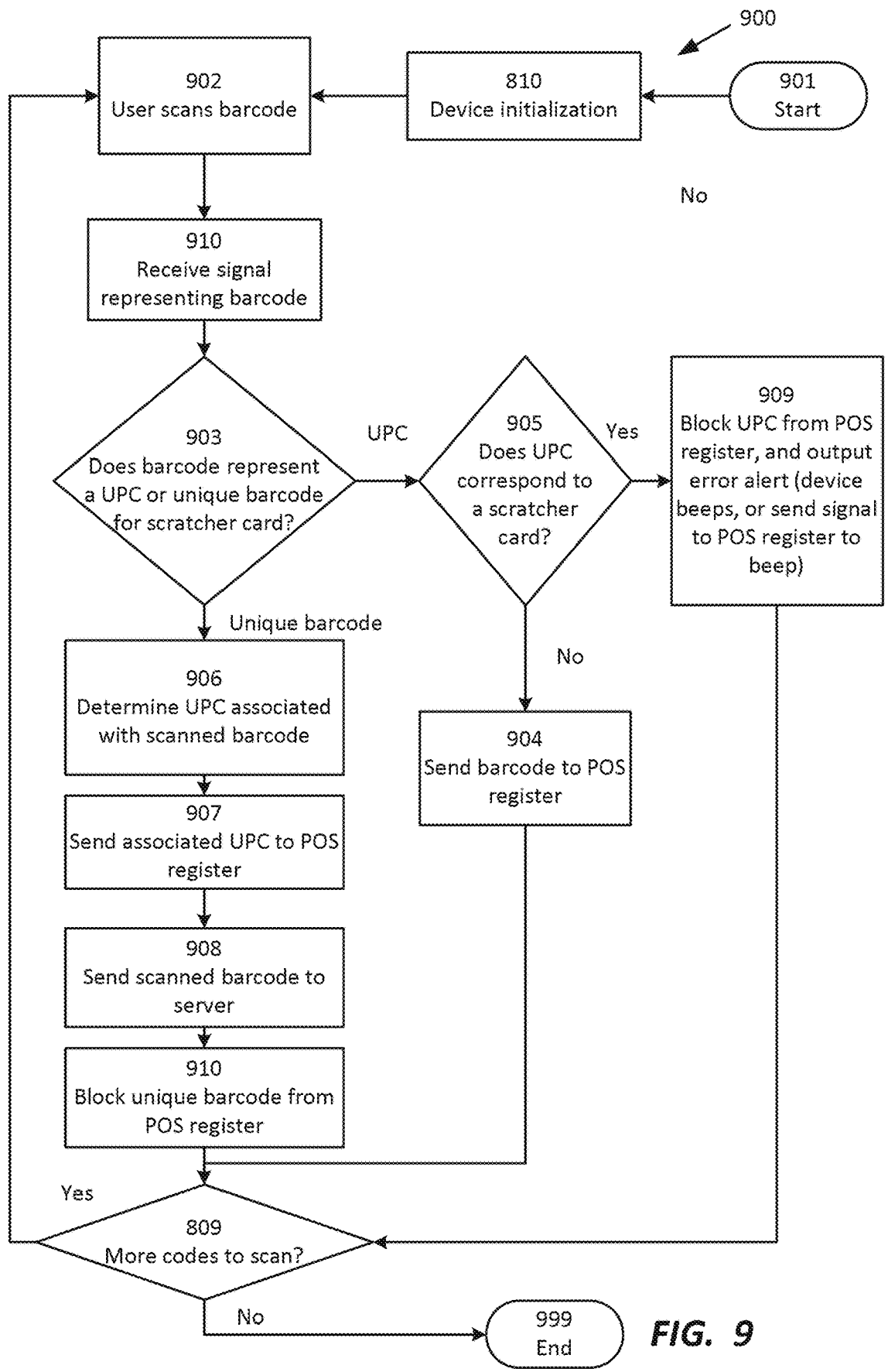
FIG. 9 is a flowchart depicting a method of real-time inventory tracking, by scanning unique barcodes during scratcher card sales, according to one embodiment.

Referring now to FIG. 9, there is shown a flowchart depicting a method 900 of real-time inventory tracking, by scanning unique barcodes 101 during scratcher card sales, according to one embodiment. According to the embodiment exemplified by method 900, users are expected to scan unique barcodes 101, rather than UPCs 102, when processing a sale of a scratcher card. If the user inadvertently scans a scratcher card's UPC 102 instead of the unique barcode 101, device 201 detects this condition and instructs the user to scan unique barcode 101 instead. Such instruction can be provided via an on-device speaker, or via a display screen, or via a warning light or alert sound, or any combination thereof. Device 102 may also block transmission of the scanned UPC 102 to POS register 203, or may send a garbled message to POS register 203 to cause POS register 203 to output an error message.

The method begins 901. In at least one embodiment, a device initialization step 810 may be performed in which device 201 is powered on. As described above in connection with FIG. 8, in at least one embodiment, device 201 automatically recognizes the brands of devices being used (including scanner 202 and POS register 203), and automatically configures itself to communicate with these devices. In at least one embodiment, an indicator, such as an LED lamp, illuminates to confirm that device 201 has established connections with scanner 202 and POS register 203. Additional steps, such as registering device 201, linking it to an online account at server(s) 206, whether manually or automatically, can also be performed as described above in connection with FIG. 8.

In addition, as described above, in at least one embodiment, device 201 is able to automatically download new data and/or software updates periodically.

In addition, as described above, in at least one embodiment, if device 201 is not working properly, or if communications cannot be established, device 201 can default to functioning in a "pass-through" mode, wherein barcode data read by device 201 is relayed to POS register 203 without being blocking, modified, or otherwise processed.

Once device initialization 810 has taken place, the user, who may be an employee such as a cashier, uses scanner 202 to scan 902 a barcode on a scratcher card. Device 201 receives 910 a signal representing the barcode, and determines 903 whether the scanned barcode is a UPC 102 or a unique barcode 101 associated with a scratcher card.

If the scanned barcode is a UPC 102, device 201 determines 905 whether the scanned UPC 102 corresponds to a scratcher card or some other product. If it corresponds to some other product, device 201 sends 904 a signal to POS register 203 representing UPC 102, so that POS register 203 can process the sale. In at least one embodiment, the signal transmitted 904 by device 201 to POS register 203 is identical to (or virtually identical to) the signal received 910 by device 201 from scanner 202; essentially, device 201 simply relays the signal representing UPC 102 to POS register 203. In other embodiments, the signal transmitted 904 by device 201 to POS register 203 may differ from the signal received 910 by device 201 from scanner 202.

If, in step 905, device 201 determines that the scanned UPC 102 corresponds to a scratcher card, it outputs 909 an error alert to remind the user that, for scratcher card sales, the user should scan unique barcode 101 rather than UPC 102. In at least one embodiment, the error alert can be output by device 201, and device 201 can block the scanned UPC 102 from being transmitted to POS register 203. In other embodiments, device 201 can transmit a signal to cause POS register 203 to beep or output an error message or reminder, for example by sending an unreadable code to POS register 203. As mentioned above, the reminder to scan unique barcode 101 rather than UPC 102 can be provided via an on-device speaker, or via a display screen, or via a warning light or alert sound, or any combination thereof.

If, in step 903, device 201 determines that the scanned code is a unique barcode 101 for a scratcher card, it performs steps 906 through 908. First, device 201 determines 906 a UPC 102 associated with the scanned unique barcode 101. In at least one embodiment, UPC 102 associated with the scanned unique barcode 101 can be determined by reference to a mapping between unique ticket numbers of scratcher cards (encoded by barcodes 101) and UPCs 102. Such mapping can be provided by server(s) 206, or it can be stored locally at device 201. For example, in at least one embodiment, device 201 may recognize that the first four numbers of unique barcode 101 correspond to a game number that is stored locally on device 201, and may then look up a corresponding UPC 102 for the scratcher card game corresponding to unique barcode 101.

Device 201 then transmits 907 a signal representing the determined UPC 102 to POS register 203. In at least one embodiment, the signal transmitted 907 by device 201 to POS register 203 is identical to (or virtually identical to) the signal that would normally be sent to POS register 203 if UPC 102 on the scratcher card were scanned directly. Thus, POS register 203 sees the signal as indicating a normal sale of a scratcher card, and processes it accordingly.

Device 201 also transmits 908 a signal to server(s) 206 representing the unique ticket number encoded by unique barcode 101, along with any relevant transaction details. In at least one embodiment, in addition to or instead of step 908, device 201 may store such information locally or at any suitable data store. The information representing the unique ticket numbers can then be used, either by server(s) 206 or by device 201 itself, to generate inventory tracking reports and/or to detect missing scratcher cards. Device 201 blocks 910 transmission of a signal representing the unique barcode from reaching POS register 203.

In various embodiments, transaction details associated with the sale may come from device 201 or from other sources, depending for example on the make/model of POS register 203 and/or the interface being used. In some embodiments, device 201 may relay transactional details to server(s) 206 (via communications network 205). In other embodiments, transactional details may be obtained POS server 207 which may be running on a back-office computer or remotely, or from a database or other data source.

In at least one embodiment, even for transactions that do not include scratcher cards, device 201 can send relevant transaction details to server(s) 206 during the transaction or at the end of the transaction.

In at least one embodiment, transmission of information to server(s) 206 describing scratcher card sales can take place in real-time as such sales take place. In other embodiments, such information can be transmitted to server(s) 206 in batch form, for example on a periodic basis.

The method then determines 809 whether there are more codes being scanned. Such codes may be UPCs 102 (for scratchers or for other products) or unique barcodes 101. If there are more codes being scanned, the method returns to step 902. Otherwise, the method ends 999.

In at least one embodiment, a combination of the methods of FIGS. 8 and 9 can be implemented. For example, the overall method depicted in FIG. 8 can be used to select between sales mode and inventory audit mode as described above in connection with step 802; steps 803 through 805 can then be performed while in inventory audit mode. However, when in sales mode, rather than performing steps 806 through 808, the system can perform steps 903 through 909, so as to provide real-time inventory tracking for scratcher cards.

By providing improved tracking of scratcher cards according to methods such as those depicted in FIG. 8 or 9, the techniques described herein are able to minimize loss due to theft and other factors. In at least one embodiment, inventory tracking reports can be generated by server(s) 206 and/or other components, and presented to a manager, owner, administrator, or other user via any suitable front-end user interface, such as a web-based interface or app-based interface. Users can also modify and/or process the raw data collected by server(s) 206, so as to generate any desired reports. Such reports can indicate, for example, possible theft or loss, statistics as to what times of day and what shifts tend to experience the greatest amounts of loss or theft, and/or other useful information. Loss and theft can thus be predicted and steps can be taken to reduce such instances.

Variations and Advantages

As described above, the techniques described herein can provide improved inventory control and theft reduction. In addition, the described techniques can be used to provide further advantages. For example, in at least one embodiment, device 201 can record and send all unique barcodes 101 scanned by scanner 202 to server(s) 206 for analysis, forecasting, inventory tracking, and/or the like. In this manner, the described system is not limited to tracking scratcher card barcodes.

In addition, the described techniques can be used to provide improvements in suggested pricing and forecasted ordering. Such improvements can be applied to any type of products, and need not be limited to lottery tickets. The following are some examples of improvements enabled by the described system.

Accounting for Multiple Packs of the Same Game being Sold Simultaneously

In many cases, retailers may include multiple displays that offer the same scratcher game, so as to attract more shopper attention to the product and generate more sales. However, such an arrangement can complicate the task of tracking sales and inventory, because the system needs to take into account the possibility of ticket inventory coming from multiple packs of the same game. Calculating the change in inventory may thus require more complex arithmetic when there are multiple packs, each with its own set of barcode sequences.

To complicate the matter further, the number of packs being offered for sale simultaneously may change as packs sell out, or in response to changes in the display configuration at the store.

In at least one embodiment, the system and method described herein can automatically account for such scenarios, without requiring a cashier, employee, manager, or storeowner to explicitly specify the number of packs being offered for each game. In fact, by enabling the simultaneous tracking of multiple packs of the same game, using the automated techniques described herein, the system and method provide improved accuracy in inventory management and control. In at least one embodiment, the system and method can detect a change in the number of packs being offered, by keeping track of all packs that are being sold for a specific game at a given time. If one pack disappears, the system checks if the amount of sales and the amount of shift in the other packs, and determines whether the pack is missing, or if it was just sold out. If not enough sales occurred to justify the pack to be sold out, then pack is determined to be missing, and its remaining cards are considered missing until the pack is scanned again. When this occurs, the employee or manager can be alerted, either via a report generated by the system or by some other means. If this change is not expected, the cashier, employee, manager, or storeowner can investigate whether the change may be due to theft or loss.

Accounting for Scratcher Card Returns

Sometimes, scratcher cards are returned by shoppers and are placed back into inventory. Conventionally, returns can presents a problem for inventory tracking, because a returned scratcher card will almost always have a pack/ID number that is out of order with the adjacent tickets in inventory.

In at least one embodiment, the described system and method can recognize when a scratcher card has been returned, by receiving transaction details from the transactional data interface whenever a scratcher has been returned. Subsequently, for example during the next inventory audit, if a returned scratcher card is scanned, the system can recognize it as a returned scratcher card, and avoid generating an alert indicating missing tickets. In this manner, false positive alerts can be avoided.

Tracking Stock Room Inventory

In addition to scratcher cards that are in the store display, each store usually has a number of packs of scratcher cards in a back office or store room. These may include packs that have not yet been activated, and will be activated once they are placed in the store display.

In at least one embodiment, the described system and method allow stores to easily track the packs that may be stored in a stockroom but not yet displayed to customers on the sales floor. For example, a cashier, employee, manager, storeowner, or other user can invoke a stock room audit mode, for example by entering a command, selecting from a menu, pressing a button, speaking a command, or scanning a special barcode. The cashier, employee, manager, storeowner, or other user can then scan unique barcode 101 for each pack in the stockroom. In at least one embodiment, the system then keeps track of all the packs in the store, and further tracks the respective status of each pack (e.g., in stock room, activated, selling, sold, returned, missing, and/or the like). In at least one embodiment, the system can generate an alert if any packs fail to go through the entire lifecycle.

In addition, in at least one embodiment, the system can communicate and reconcile with state lottery data, as described in more detail, so that it knows which packs the store should be expected to have on hand. If, during a stockroom audit, a pack that should be present is not found, the system can automatically generate an alert.

Reconciling with State Lottery Data

Some state lotteries (e.g., the California state lottery) provide an online portal where lottery vendors can access reports that show what they have been charged for, which packs have been activated, and what their inventory should be according to the state lottery's records. In at least one embodiment, the described system and method can automatically access information via this online portal, given approval of the manager or storeowner. The system can then detect any discrepancies between the two systems of record, and provide assurance that the retailer is not being overcharged by the lottery, and that cashiers or other employees are not stealing from the stock room. Such an arrangement also allows the system to account for instances where the partial or complete packs have been removed from the inventory, for example by lottery officials. By accessing the online portal, the system provides an automated mechanism for reducing false positive alerts and providing greater accuracy in inventory reports, thus eliminating unnecessary investigative work for the storeowner/manager.

Improved Tracking

In at least one embodiment, the system can include transactional data interface 707 that provides information on every transaction that is performed via POS register 203. Such interface 707 may include any system for collecting and/or providing additional information about transactions, including for example an interface to a surveillance system installed at the retail location. Using data from interface 707, the system can track any available information about transactions, including for example confirmation of payment, the items scanned/purchased, the cashier working the register, the register number, the transaction number, the sequence of buttons that were pushed, and any other events that take place in connection with transactions.

Any suitable mechanism can be used for obtaining such transactional data. In particular, various makes/models of POS registers 203 offer different types of interfaces. For example, POS registers 203 from Gilbarco offer a security camera interface providing real-time line-by-line transaction details, while those from Verifone provide an interface that may be accessed from a computer or other device at the retail location. Other POS registers 203 offer a cloud-based interface, which allows access to transactional data directly from a cloud-based sewer. Yet others offer a surveillance feed. Accordingly, in various embodiments, transactional data interface 707 can take any of a number of different forms so as to interface with available technology and receive transactional data accordingly.

Such transactional data can then be transmitted to server(s) 206, along with information regarding scans of barcodes such as UPCs 102 and/or unique barcodes 101. Using such information from server(s) 206, a front-end system, such as a web page or smartphone app, can generate reports indicating sales and activities that have occurred in the store. Retailers can use such reports to better tailor their retail offerings, improve efficiency, reduce loss and waste, and improve profitability. Examples of such reports that can be generated by a front-end system include: pricing of products; quantity sold; voids; subtotals; methods of payment; refunds; and the like.

In at least one embodiment, any suitable reports can be generated, using any front-end reporting systems connected to server(s) 206. In at least one embodiment, EDI may be used as a communications medium between server(s) 206 and other components such as front-end reporting systems; alternatively, any other medium can be used. Reports may thereby be generated to provide retailers with improved insight as to inventory tracking and management, including predictive functionality. Through information received from the described system as to what scratcher cards (and/or other products) are being sold, and in what quantities, optionally supplemented by information from transactional data interface 707, the described techniques allow retailers to better manage their inventory. Improved forecasting enabled by the described techniques can help enhance efficiency and lower costs.

For example, the system can generate forecasts as to which scratcher cards should be ordered and in what quantity, by tracking inventory and sales rates, and tracking what specific ticket number in each pack is currently up for sale. If the system determines that a pack is nearly empty, it can suggest ordering new tickets.

Marketing Platform

In at least one embodiment, the system and method described herein can be used to implement an improved marketing platform that allows manufacturers and distributors of products to market directly to consumers without necessarily involving the retailer. Such techniques can be used in connection with any brand, whether carried by a small convenience store, grocery store, or large department store.

Figure 10:
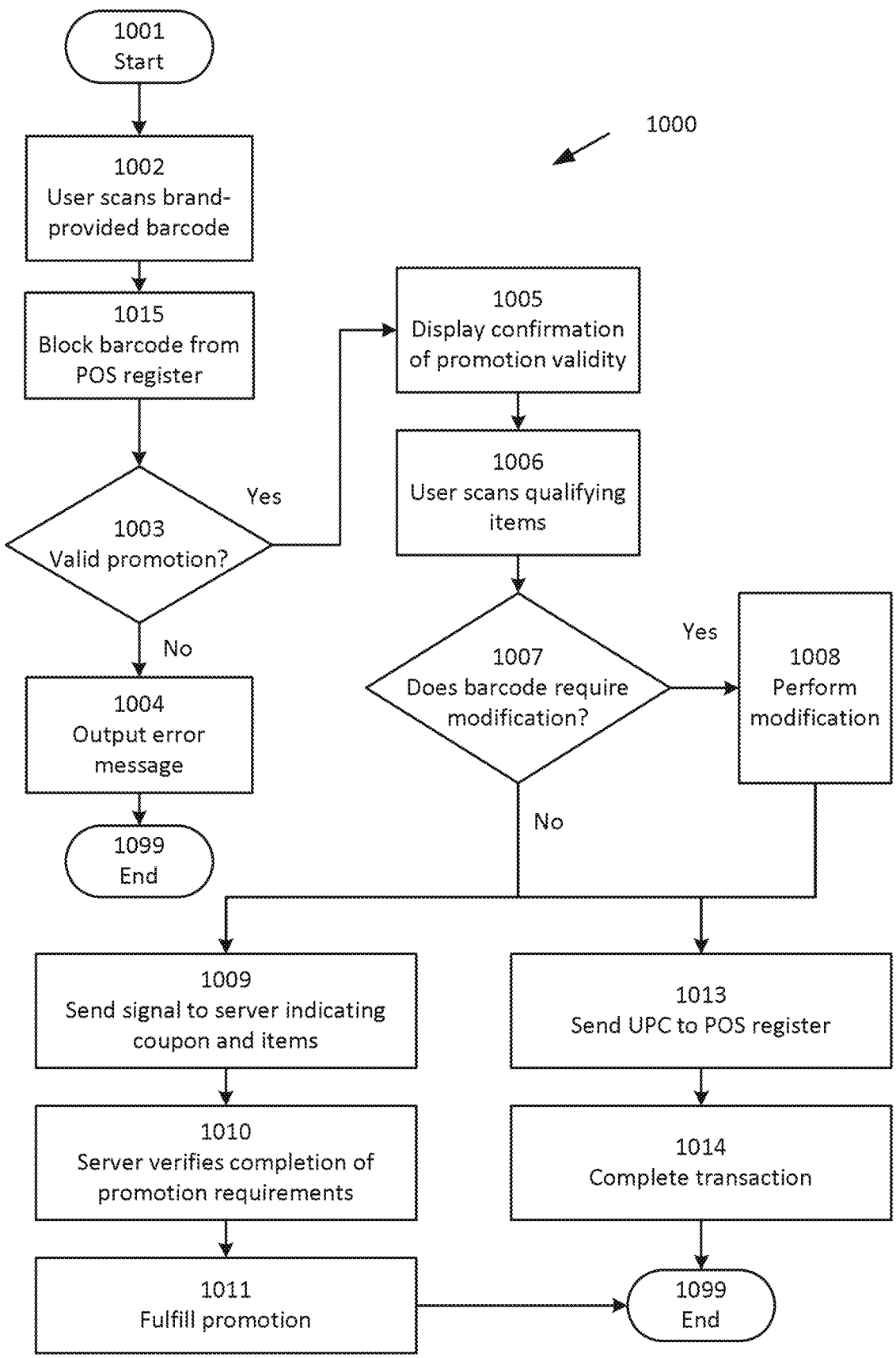
FIG. 10 is a flowchart depicting a method of using scanned barcodes to enable an improved direct marketing platform, according to one embodiment.

Referring now to FIG. 10, there is shown an example of a method 1000 for using scanned barcodes to enable an improved direct marketing platform, according to one embodiment.

For example, a soda manufacturer might run a promotion/campaign on a new type of soda. The campaign might be executed on a social media platform, sending shoppers to local stores. The campaign might require, for example, that the shopper buy two sodas to get one free by first scanning a brand-supplied promotional barcode and then scanning the qualifying purchases to the shopper's cart.

The method begins 1001. The shopper redeems the promotion at a store equipped with device 201 as described herein. First, the user (who may be a cashier or other employee) uses scanner 202 to scan 1002 the promotional barcode (displayed, for example, on the shopper's phone). Device 201 intercepts the scanned barcode, recognizing it as a promotional barcode; therefore, the barcode is blocked 1015 from being transmitted to POS register 203. Rather, upon receiving this barcode, device 201 begins the process of keeping track of what is being scanned. First, device 201 checks 1003 whether the barcode refers to a valid (and current) promotion; if not, device 201 can output 1004 an error message (or can cause POS register 203 to output an error message), and the method ends 1099.

If the barcode refers to a valid (and current) promotion, device 201 displays 1005 confirmation of the validity of the promotion. The user then uses scanner 202 to scan 1006 the qualifying items the shopper is purchasing. This can include scanning UPCs 102 and/or any other barcodes as normal.

Device 201 then determines 1007 whether the scanned UPC(s) 102 or other barcode(s) should be modified before they are transmitted to server(s) 206 and/or POS register 203. If so, device 201 performs 1008 the modification. Such modification may include, generating a price-embedded barcode to be sent to POS register 203, including an instant price modification of the product. Alternatively, device 201 may generate a barcode that includes a link to a promotion or coupon. In various embodiments, other types of modifications to the barcode can be performed.

In addition to (or instead of) modifying the barcode(s), device 201 can also send an extra barcode to POS register 203. For example, if a "buy two sodas get the third free" promotion is in effect, device 201 can generate and send a barcode representing the third soda to POS register 203 automatically, without the need for the cashier to scan the third soda.

Device 201 sends 1013 a signal representing UPC 102 (or any other barcode, including a price-embedded barcode or other barcode generated by device 201) to POS register 203 so that the transaction can be completed 1014. Optionally, based on the barcode scanned in step 1002, device 201 can signal POS register 203 to automatically apply a discount to the transaction. Device 201 also sends 1009 a signal to server(s) 206, indicating the coupon and purchased items, so that the promotion can be fulfilled. Server(s) 206 verifies 1010 that all requirements of the promotion have been completed, and fulfills 1011 the promotion. Fulfilling 1011 the promotion may include any or all of:

contacting the shopper to obtain any additional needed information;

sending a rebate, coupon, or offer code directly to the shopper, either in electronic or physical form, or by direct transfer to a shopper's bank account, Venmo account, or similar;

sending an item (such as a "thank you" gift) to the shopper;

and/or the like.

Notably, fulfillment 1011 of the promotion can take place without requiring any additional input or action from the retailer or its employees. Rather, a manufacturer or distributor can take action to fulfill 1011 the promotion directly with the shopper, by electronic means and/or by mailing/shipping an item or coupon to the shopper. By eliminating the need for to have retailers involved in promotions, the described method can reduce needed training of staff, reduce errors, and can speed up transactions/checkout times. In addition, such an arrangement gives suppliers direct access to shoppers, without creating any additional burden on the retailer, in effect establishing a direct relationship between a shopper and a manufacturer or distributor of a product. Such a relationship can be helpful for future marketing purposes. In addition, the described method allows offers and promotions to be personalized and targeted to specific shoppers, based on any suitable factors.

Shopper Loyalty Programs

Figure 11:
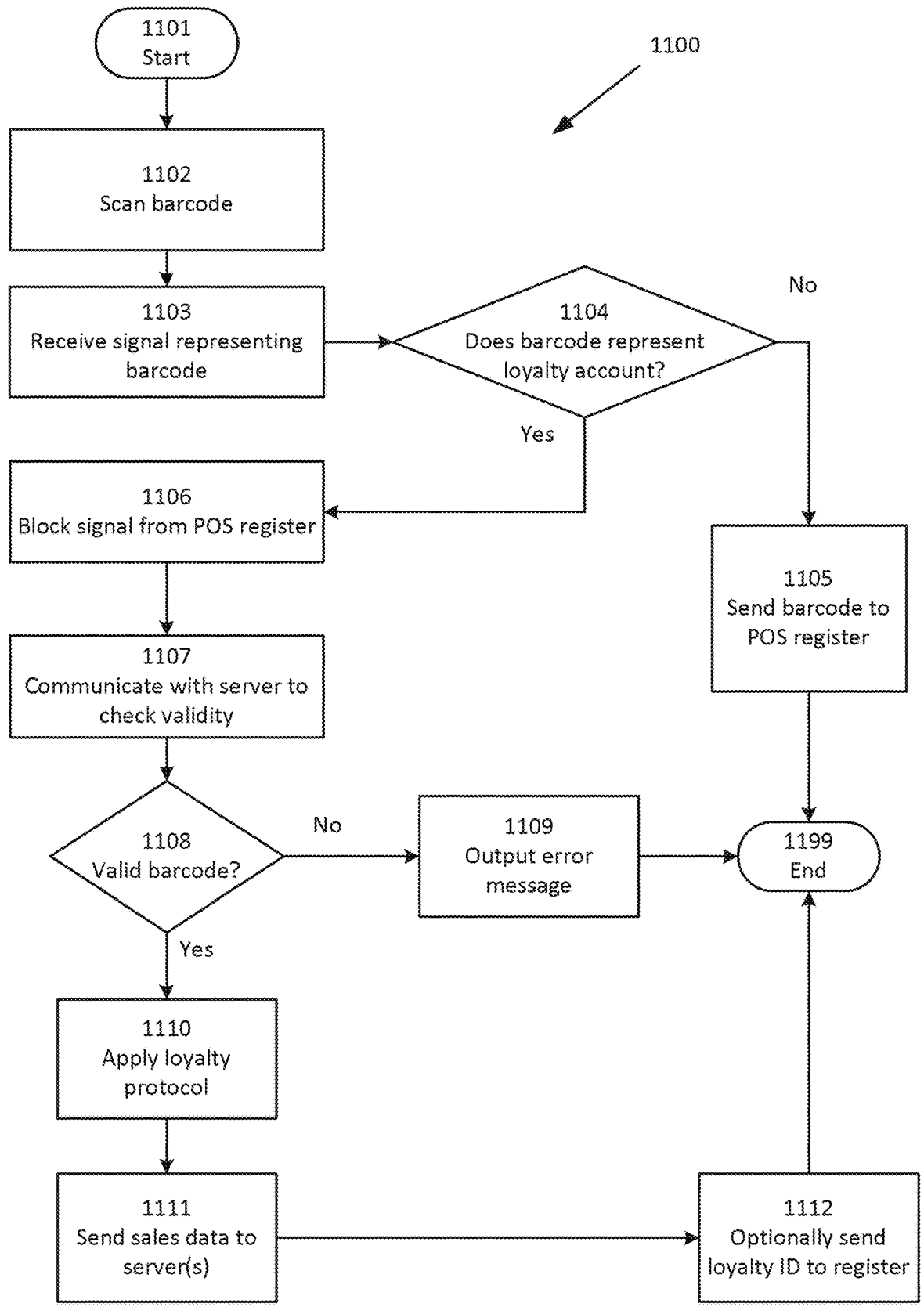
FIG. 11 is a flowchart depicting a method of using scanned barcodes to enable an improved shopper loyalty program, according to one embodiment.

In at least one embodiment, the system and method described herein can be used to enable an improved shopper loyalty program. For example, the system and method can enable multiple loyalty platforms to be run without the need for any additional hardware or computers onsite, allowing for improved flexibility and functionality. Referring now to FIG. 11, there is shown a flowchart depicting a method 1100 of implementing such a program according to one embodiment.

The method begins 1101. Scanner 202 is used to scan 1102 a barcode, and device 201 receives 1103 a signal representing the scanned barcode. Device 201 then determines 1104 whether the scanned barcode represents a shopper's loyalty account; for example, the barcode may have been scanned from a shopper's loyalty card, photo ID (such as a driver's license or employee badge), smartphone (such as an onscreen QR code), and/or any other machine-readable code associated with the shopper. If the scanned barcode does not represent a loyalty account, device 201 sends 1105 a signal representing the barcode to POS register 203 for normal processing, and the method ends 1199.

If, in step 1104, the scanned barcode represents a loyalty account, device 201 blocks 1106 the signal representing the barcode from reaching POS register 203. Device 201 communicates 1107 with a server (such as one of server(s) 206, and/or any server that contains information about loyalty accounts) to check the validity of the barcode representing the loyalty account. In step 1108, if the barcode does not represent a valid loyalty account, device 201 outputs 1109 an error message (or causes POS register 203 to output an error message), and the method ends 1199.

If, in step 1108, the barcode represents a valid loyalty account, a loyalty protocol is applied 1110, for example to provide a discount or other reward. A visual indicator, auditory indicator, and/or voice prompt may be output to let the cashier and shopper know that a valid code has been scanned. Scans of products, including scratcher cards and/or other products, can proceed normally, and appropriate discounts and incentives are applied. In addition, the shopper's purchases can be tracked for marketing purposes. Sales data is sent 1111 to server(s) 206 for tracking purposes, report generation, and/or marketing. If appropriate, the loyalty ID encoded by the barcode can also be sent 1112 to POS register 203. The method then ends 1199.

By using the described techniques, the system can replace physical loyalty cards. Enrollment can be made very simple, for example by scanning a barcode that initiates an enrollment protocol for the system, followed by enrollment information for the shopper. For example, after scanning the enrollment protocol barcode, the cashier can scan the barcode for the shopper's drivers license (or other ID), phone-based QR code, and/or the like, to complete the enrollment process.

Applications for Employment

In at least one embodiment, the described system can be used to facilitate applications for employment. Scanner 202 is used to scan an enrollment barcode, followed by the applicant's driver's license (or another ID). In at least one embodiment, a code representing contact information for the applicant can also be scanned, for later follow-up. Signals representing such barcodes are blocked by the device 201 from reaching POS register 203, as they use protocols that are outside the scope of POS register 203.

Employee Time Tracking

In at least one embodiment, the described system can be used for employee time tracking. Each employee has a unique barcode, such as may be provided on ID badges or on their smartphones. Scanner 202 is used to scan such barcodes when the employee begins and/or ends a work shift. Employee time tracking information can then be transmitted to server(s) 206 for generating time tracking reports. Again, signals representing such barcodes are blocked by the device 201 from reaching POS register 203, as they use protocols that are outside the scope of POS register 203.

Such an embodiment allows for multiple payroll companies and time tracking services to use the described system by simply installing a driver on device 201, so as to subsequently receive time tracking information without the need for any additional hardware, such as a separate computer, fingerprint reader, or the like.

Presence Check-in

In at least one embodiment, the system can be used to permit visitors, vendors, and/or other individuals to check in when they are onsite at a location. Each such individual can have a unique barcode, such as may be provided on an ID badge or smartphone. Scanner 202 is used to scan such barcodes when the individual arrives or leaves. Time tracking information can then be transmitted to server(s) 206 for generating visitation reports. Again, signals representing such barcodes are blocked by the device 201 from reaching POS register 203, as they use protocols that are outside the scope of POS register 203.

Timers for Perishable Items

For hot food, coffee, and other perishable items, timers may be needed to ensure that items being sold are fresh. In at least one embodiment, the described system and method can be used to track elapsed time for perishable items, track waste, and make suggestions for improvements or adjustments to preparation schedules. Device 201 can also send messages to POS register 203 indicating that a specified time period has elapsed, so that POS register 203 can issue an alert.

For example, using a variety of barcodes scannable by scanner 202, timers can be automatically started, products can be prepared or discarded, and expiration times for products can be set. The system can thereby eliminate the need for manually-activated timers and paper product logs. Again, signals representing such barcodes are blocked by the device 201 from reaching POS register 203, as they use protocols that are outside the scope of POS register 203.

Bill Payment

Figure 12:
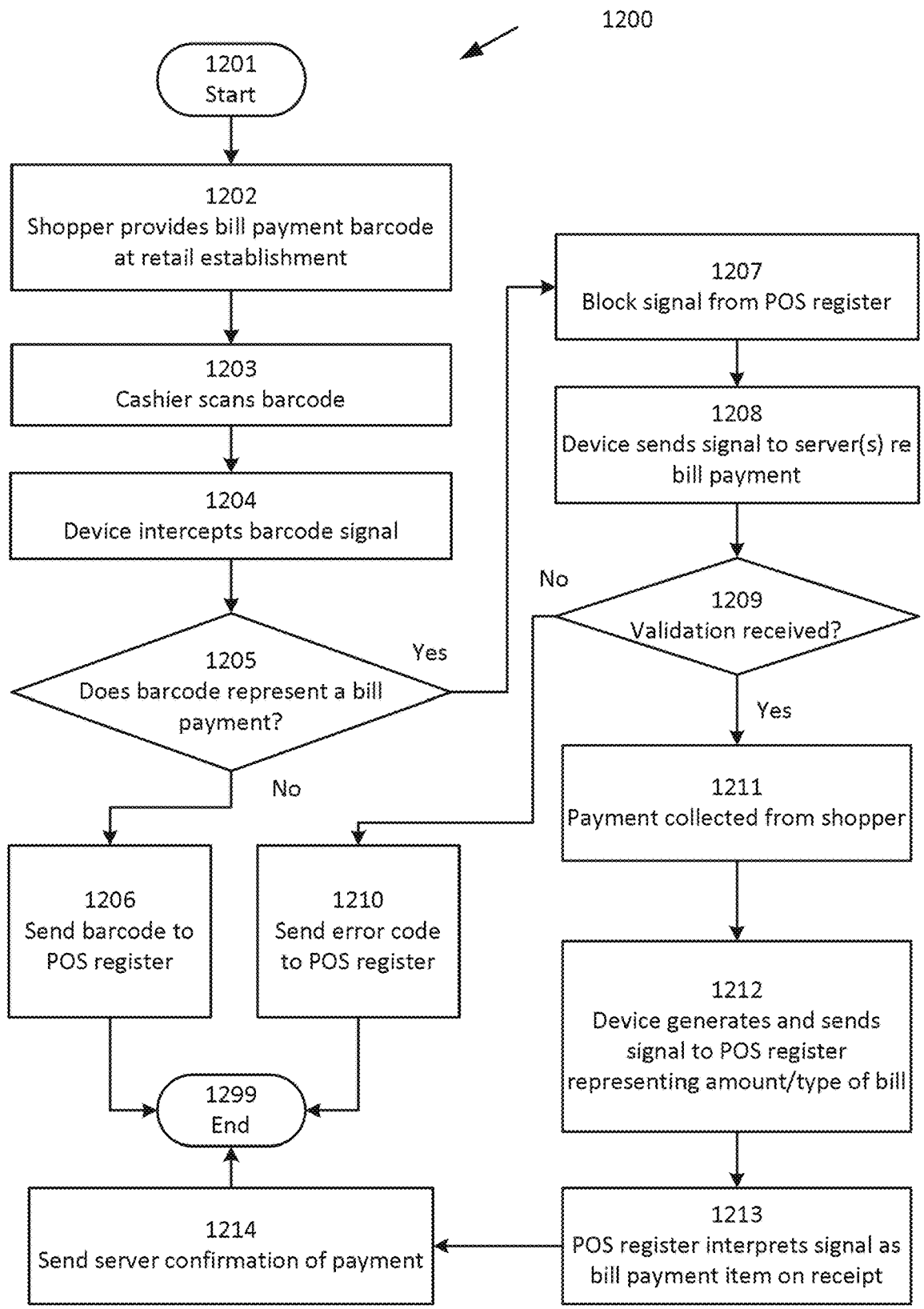
FIG. 12 is a flowchart depicting a method for using the described system to facilitate bill payment transactions, according to one embodiment.

In at least one embodiment, the described system and method can be used to facilitate bill payment transactions, such as payment of bills for utilities, cell phone service, streaming service, cable service, and/or the like, by presenting a unique barcode to a cashier at a retail establishment. Referring now to FIG. 12, there is shown an example of method 1200 for using the described system to facilitate bill payment transactions, according to one embodiment.

The method begins 1201. A shopper provides 1202 a bill payment barcode at a retail establishment. A cashier at the retail establishment scans 1203 the barcode. Device 201 intercepts 1204 the signal representing the barcode, and determines 1210 whether the barcode represents a bill payment. If not, device 201 sends 1206 a signal representing the barcode to POS register 203 for processing, and the method ends 1299.

If, in step 1210, device 201 determines that the barcode represents a bill payment, it determines (from the barcode) the amount and intended payee for the bill payment (e.g., pay the shopper's $132.41 electricity bill for the month). Device 201 blocks 1207 the signal representing the barcode from reaching POS register 203, and sends 1208 a signal to inform server(s) 206 that the shopper is paying a bill. In step 1209, device 201 awaits validation of the bill payment from server(s) 206. If no validation is received, device 201 generates and sends 1210 an error code to POS register 203, and the method ends 1299.

If, in step 1209, validation is received, payment is collected 1211 from the shopper for the bill payment item (along with any other items the shopper may be purchasing at the same time), using whatever payment method the shopper is using at the retail establishment. Device 201 then generates 1212 and sends a signal representing a barcode that is recognized by POS register 203, and including the amount and/or type of bill being paid. In at least one embodiment, the signal generated in step 1205 may represent an embedded price barcode, so that it encodes a specific price. POS register 203 interprets 1213 the signal as a bill payment item, for example displaying "Electricity Bill $132.41" on the register and showing a similar item on the receipt. In at least one embodiment, confirmation of payment can also be received via transactional data interface 707. With the combination of data from these sources, the system can confirm that the shopper has completed the transaction and paid the full amount of his or her bill to the retail establishment. Device 201 sends 1214 server(s) 206 confirmation of payment of the bill, so that the biller can collect payment for the bill from the retail establishment. The method then ends 1299.

Additional Applications

In various embodiments, device 201 can interface with scanner 202, and can also obtain additional transactional data, to provide any number of additional applications. Such applications may provide additional insight as to sales, employee tracking, and/or other activities relevant to a retail establishment or other commercial place of business. In various embodiments, such functionality can be implemented while avoiding the need for extensive setup. The system is able to avoid reliance on non-standard protocols, instead using scanners 202, transactional interfaces to other components, and the like, which can be easily connected to one another and operated in a plug-and-play application. In this manner, the described system expands the capabilities of scanner 202 and reduces or eliminates the need for extra hardware to accomplish various tasks.

One skilled in the art will recognize that the examples depicted and described herein are merely illustrative, and that other arrangements can be used. In addition, some of the depicted elements can be omitted or changed, and additional elements depicted, without departing from the essential characteristics.

The present system and method have been described in particular detail with respect to several possible embodiments. Those of skill in the art will appreciate that the system and method may be practiced in other embodiments. The particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various components described herein is merely exemplary, and not mandatory; functions performed by a single component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission, or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A system for automatically processing data representing machine-readable codes, comprising:
   a scanner, configured to scan at least two types of machine-readable codes; and
   a device, communicatively coupled to the scanner, to a point-of-sale register, and to a server, the device configured to receive signals from the scanner and to selectively transmit signals to the point-of-sale register and to the server;
   wherein the device is further configured to:
   responsive to receiving a signal from the scanner representing a scanned machine-readable code of a first type, transmit the signal representing the machine-readable code to the point-of-sale register; and
   responsive to receiving a signal from the scanner representing a scanned machine-readable code of a second type, transmit the signal representing the machine-readable code to the server via an electronic communications network.

2. The system of claim 1, wherein:
   the machine-readable code of the first type comprises a product barcode representing a type of product; and
   the machine-readable code of the second type comprises a unique barcode representing a single instance of a product.

3. The system of claim 2, wherein the device is further configured to selectively modify the signal from the scanner representing the product barcode prior to transmitting it to the point-of-sale register.

4. The system of claim 2, wherein the product barcode comprises a universal product code (UPC).

5. The system of claim 2, wherein the device is further configured to:
   responsive to receiving a signal from the scanner representing a unique barcode representing a single instance of a product:
   block transmission of the signal to the point-of-sale register;
   determine a product barcode corresponding to the scanned unique barcode; and
   transmit, to the point-of-sale register, a signal representing the product barcode.

6. The system of claim 2, wherein the unique barcode representing a single instance of a product comprises a barcode representing a scratcher card lottery ticket.

7. The system of claim 2, wherein the device is configured to operate in at least two modes, comprising:
   a sales mode for recording sales; and
   an inventory audit mode for gathering inventory tracking data.

8. The system of claim 7, wherein:
   in the sales mode, the device is configured to receive signals representing product barcodes, and to transmit the signals to the point-of-sale register; and
   in the inventory audit mode, the device is configured to receive signals representing unique barcodes each representing a single instance of a product, and to transmit the signals to the server.

9. The system of claim 8, wherein, in the inventory audit mode, the device is configured to block signals representing unique barcodes each representing a single instance of a product from reaching the point-of-sale register.

10. The system of claim 7, wherein the device is configured to switch between the at least two modes in response to user input.

11. The system of claim 7, wherein:
    the device is configured to switch to the sales mode in response to receiving a signal representing a scanned product barcode; and
    the device is configured to switch to the inventory audit mode in response to receiving a signal representing a scanned unique barcode representing a single instance of a product.

12. The system of claim 7, wherein:
    the device is configured to switch to the sales mode in response to receiving a signal representing a scanned product barcode; and
    the device is configured to switch to the inventory audit mode in response to receiving signals representing at least a predetermined number of consecutive scanned unique barcodes each representing a single instance of a product.

13. The system of claim 7, wherein:
    in the sales mode, the device is configured to output an error alert responsive to receiving a signal representing a scanned unique barcode representing a single instance of a product;
    in the inventory audit mode, the device is configured to output an error alert responsive to receiving a signal representing a scanned product barcode.

14. A method for automatically processing data representing machine-readable codes, comprising:
    at a device communicatively coupled to a scanner, receiving, from the scanner, a signal representing a scanned machine-readable code;
    responsive to the scanned machine-readable code being of a first type, transmitting the signal to a point-of-sale register; and
    responsive to the scanned machine-readable code being of a second type, transmitting the signal to a server, via an electronic communications network.

15. The method of claim 14, wherein:
the machine-readable code of the first type comprises a product barcode representing a type of product; and
the machine-readable code of the second type comprises a barcode representing a single instance of a product.

16. The method of claim 15, wherein transmitting the signal to the point-of-sale register comprises:
selectively modifying the signal received from the scanner; and
transmitting the selectively modified signal to the point-of-sale register.

17. The method of claim 15, wherein the product barcode comprises a universal product code (UPC).

18. The method of claim 15, further comprising:
responsive to the scanned machine-readable code being a unique barcode representing a single instance of a product:
blocking transmission of the signal to the point-of-sale register;
determining a product barcode corresponding to the scanned barcode; and
transmitting, to the point-of-sale register, a signal representing the product barcode.

19. The method of claim 15, wherein the unique barcode representing a single instance of a product comprises a barcode representing a scratcher card lottery ticket.

20. The method of claim 15, further comprising establishing a mode of operation for the device, wherein the mode of operation is selected from a set of a modes comprising:
a sales mode for recording sales; and
an inventory audit mode for gathering inventory tracking data.

21. The method of claim 20, further comprising:
responsive to the device being in the sales mode, automatically configuring the device to receive signals representing product barcodes, and to transmit the signals to the point-of-sale register; and
responsive to the device being in the inventory audit mode, automatically configuring the device to receive signals representing unique barcodes each representing a single instance of a product, and to transmit the signals to the server.

22. The method of claim 21, further comprising:
responsive to the device being in the inventory audit mode, automatically configuring the device to block signals representing unique barcodes each representing a single instance of a product from reaching the point-of-sale register.

23. The method of claim 20, wherein establishing a mode of operation for the device comprises:
receiving user input; and
establishing the mode of operation based on the received user input.

24. The method of claim 20, wherein establishing a mode of operation for the device comprises:
responsive to receiving a signal representing a scanned product barcode, automatically establishing the sales mode; and
responsive to receiving a signal representing a scanned unique barcode representing a single instance of a product, automatically establishing the inventory audit mode.

25. The method of claim 20, wherein establishing a mode of operation for the device comprises:
responsive to receiving a signal representing a scanned product barcode, automatically establishing the sales mode; and
responsive to receiving signals representing at least a predetermined number of consecutive scanned unique barcodes each representing a single instance of a product, automatically establishing the inventory audit mode.

26. The method of claim 20, further comprising:
while in the sales mode, responsive to receiving a signal representing a scanned unique barcode representing a single instance of a product, outputting an error alert;
while in the inventory audit mode, responsive to receiving a signal representing a scanned product barcode, outputting an error alert.

27. A non-transitory computer-readable medium for automatically processing data representing machine-readable codes, comprising instructions stored thereon, that when performed by a device communicatively coupled to a scanner, perform the steps of:
receiving, from the scanner, a signal representing a scanned machine-readable code;
responsive to the scanned machine-readable code being of a first type, transmitting the signal to a point-of-sale register; and
responsive to the scanned machine-readable code being of a second type, transmitting the signal to a server, via an electronic communications network.

28. The non-transitory computer-readable medium of claim 27, wherein:
the machine-readable code of the first type comprises a product barcode representing a type of product; and
the machine-readable code of the second type comprises a barcode representing a single instance of a product.

29. The non-transitory computer-readable medium of claim 28, wherein transmitting the signal to the point-of-sale register comprises:
selectively modifying the signal received from the scanner; and
transmitting the selectively modified signal to the point-of-sale register.

30. The non-transitory computer-readable medium of claim 28, wherein the product barcode comprises a universal product code (UPC).

31. The non-transitory computer-readable medium of claim 28, further comprising instructions stored thereon, that when performed by the device, perform the steps of:
responsive to the scanned machine-readable code being a unique barcode representing a single instance of a product:
blocking transmission of the signal to the point-of-sale register;
determining a product barcode corresponding to the scanned barcode; and
transmitting, to the point-of-sale register, a signal representing the product barcode.

32. The non-transitory computer-readable medium of claim 28, wherein the unique barcode representing a single instance of a product comprises a barcode representing a scratcher card lottery ticket.

33. The non-transitory computer-readable medium of claim 28, further comprising instructions stored thereon, that when performed by the device, perform the steps of establishing a mode of operation for the device, wherein the mode of operation is selected from a set of a modes comprising:
a sales mode for recording sales; and
an inventory audit mode for gathering inventory tracking data.

34. The non-transitory computer-readable medium of claim 33, further comprising instructions stored thereon, that when performed by the device, perform the steps of:
  responsive to the device being in the sales mode, automatically configuring the device to receive signals representing product barcodes, and to transmit, to the point-of-sale register, signals representing the product barcodes; and
  responsive to the device being in the inventory audit mode, automatically configuring the device to receive signals representing unique barcodes each representing a single instance of a product, and to transmit the signals to the server.

35. The non-transitory computer-readable medium of claim 34, further comprising instructions stored thereon, that when performed by the device, perform the steps of:
  responsive to the device being in the inventory audit mode, automatically configuring the device to block signals representing unique barcodes each representing single instances of a product from reaching the point-of-sale register.

36. The non-transitory computer-readable medium of claim 33, wherein establishing a mode of operation for the device comprises:
  receiving user input; and
  establishing the mode of operation based on the received user input.

37. The non-transitory computer-readable medium of claim 33, wherein establishing a mode of operation for the device comprises:
  responsive to receiving a signal representing a scanned product barcode, automatically establishing the sales mode; and
  responsive to receiving a signal representing a scanned unique barcode representing a single instance of a product, automatically establishing the inventory audit mode.

38. The non-transitory computer-readable medium of claim 33, wherein establishing a mode of operation for the device comprises:
  responsive to receiving a signal representing a scanned product barcode, automatically establishing the sales mode; and
  responsive to receiving signals representing at least a predetermined number of consecutive scanned unique barcodes each representing single instances of a product, automatically establishing the inventory audit mode.

39. The non-transitory computer-readable medium of claim 33, further comprising instructions stored thereon, that when performed by the device, perform the steps of:
  while in the sales mode, responsive to receiving a signal representing a scanned unique barcode representing a single instance of a product, outputting an error alert;
  while in the inventory audit mode, responsive to receiving a signal representing a scanned product barcode, outputting an error alert.

* * * * *